United States Patent
Fuse et al.

(10) Patent No.: US 11,230,630 B2
(45) Date of Patent: Jan. 25, 2022

(54) PARTIALLY SEPARATED FIBER BUNDLE AND METHOD OF MANUFACTURING SAME, CHOPPED FIBER BUNDLE USING SAME, AND FIBER-REINFORCED RESIN FORMING MATERIAL

(71) Applicant: Toray Industries, Inc., Tokyo (JP)

(72) Inventors: Mitsuki Fuse, Nagoya (JP); Masaru Tateyama, Nagoya (JP); Hiroshi Hirano, Nagoya (JP); Satoshi Seike, Nagoya (JP); Akihiko Matsui, Nagoya (JP); Kazuma Ura, Nagoya (JP); Tetsuya Motohashi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 281 days.

(21) Appl. No.: 16/482,743

(22) PCT Filed: Jan. 26, 2018

(86) PCT No.: PCT/JP2018/002401
§ 371 (c)(1),
(2) Date: Aug. 1, 2019

(87) PCT Pub. No.: WO2018/143067
PCT Pub. Date: Aug. 9, 2018

(65) Prior Publication Data
US 2019/0352474 A1   Nov. 21, 2019

(30) Foreign Application Priority Data
Feb. 2, 2017   (JP) .............................. JP2017-017700

(51) Int. Cl.
| | | |
|---|---|---|
| *C08J 5/06* | (2006.01) | |
| *B65H 51/005* | (2006.01) | |
| *C08J 3/21* | (2006.01) | |
| *C08L 77/06* | (2006.01) | |
| *D02J 1/18* | (2006.01) | |
| *D06M 15/59* | (2006.01) | |

(52) U.S. Cl.
CPC .............. *C08J 5/06* (2013.01); *B65H 51/005* (2013.01); *C08J 3/212* (2013.01); *C08L 77/06* (2013.01); *D02J 1/18* (2013.01); *D06M 15/59* (2013.01); *C08L 2205/025* (2013.01); *C08L 2205/16* (2013.01)

(58) Field of Classification Search
CPC . C08J 5/06; C08J 3/212; C08J 2377/02; C08J 5/042; B65H 51/005; B29C 70/06; B29C 70/12; C08L 77/06; C08L 2205/025; C08L 2205/16; D06M 15/59; D02J 1/18
USPC .......................................... 523/206; 264/136
See application file for complete search history.

(56) References Cited

U.S. PATENT DOCUMENTS

| | | | | |
|---|---|---|---|---|
| 5,123,373 | A * | 6/1992 | Iyer ........................... | B05C 9/14 |
| | | | | 118/612 |
| 10,907,280 | B2 * | 2/2021 | Motohashi ........... | B65H 51/005 |
| 2012/0213997 | A1 | 8/2012 | Wang et al. | |
| 2016/0032520 | A1 * | 2/2016 | Sakata ................... | D06M 15/59 |
| | | | | 524/538 |
| 2016/0319088 | A1 * | 11/2016 | Saji ........................... | C08K 7/06 |
| 2020/0347522 | A1 * | 11/2020 | Tateyama ................. | D02G 3/40 |
| 2020/0354532 | A1 * | 11/2020 | Seike ......................... | C08J 5/06 |
| 2021/0039281 | A1 * | 2/2021 | Fuse ...................... | D06M 15/55 |

FOREIGN PATENT DOCUMENTS

| | | |
|---|---|---|
| EP | 2 687 356 A1 | 1/2014 |
| JP | 2002-255448 A | 9/2002 |
| JP | 2004-100132 A | 4/2004 |
| JP | 2011-241494 A | 12/2011 |
| JP | 2013-049208 A | 3/2013 |
| JP | 2013-104156 A | 5/2013 |
| JP | 2014-030913 A | 2/2014 |
| JP | 5512908 B1 | 4/2014 |
| WO | 2012/105080 A1 | 8/2012 |
| WO | 2013/115337 A1 | 8/2013 |
| WO | 2016/104154 A1 | 6/2016 |
| WO | 2016/136812 A1 | 9/2016 |
| WO | 2017/006989 A1 | 1/2017 |
| WO | 2017/221658 A1 | 12/2017 |

* cited by examiner

*Primary Examiner* — Hannah J Pak
(74) *Attorney, Agent, or Firm* — DLA Piper LLP (US)

(57) ABSTRACT

A partially separated fiber bundle having a surface of a reinforcing fiber coated with a sizing agent containing a water-soluble polyamide-based resin, in which a separated fiber section consisting of a plurality of separated fiber bundles and an unseparated fiber section are provided alternately along a longitudinal direction of the reinforcing fiber bundle consisting of a plurality of single yarns, wherein the reinforcing fiber bundle contains 600 fibers/mm or more and less than 1,600 fibers/mm of fibers per unit width while the reinforcing fiber has a drape level of 120 mm or more and 240 mm or less.

18 Claims, 8 Drawing Sheets

PARTIALLY SEPARATED FIBER BUNDLE AND METHOD OF MANUFACTURING SAME, CHOPPED FIBER BUNDLE USING SAME, AND FIBER-REINFORCED RESIN FORMING MATERIAL

TECHNICAL FIELD

This disclosure relates to a partially separated fiber bundle and a chopped fiber bundle using the same, and a method of manufacturing the same, and a fiber reinforced resin forming material, and is specifically configured to be added with water soluble polyamide at a proper time to prepare a forming material by partially separating fiber bundles consisting of cheap large tow having a great number of single yarns that are not supposed to be separated.

BACKGROUND

There is a well-known technology to produce a desirably shaped product by heating and compressing a forming material consisting of discontinuous reinforcing fiber (made of carbon fiber or the like) bundle aggregate (which may be called fiber bundle) and matrix resin. Such a forming material having many single yarns tends to have poor mechanical properties although fluidity is excellent at the time of forming. On the other hand, some forming materials contain fiber bundles of which number of single yarns is adjusted arbitrarily to achieve both fluidity at the time of forming and mechanical properties of shaped product.

JP 2002-255448 A and JP 2004-100132 A disclose methods of performing a fiber separation treatment of a roll body of fiber bundles made by rolling up a plurality of fiber bundles in advance. However, because those methods are restricted by the number of single yarns of fiber bundle in the preliminary treatment, the number of single yarns might not be desirably adjusted with a limited range of adjustment.

JP 2013-49208 A, JP 2014-30913 A and JP 5512908 B disclose methods of slitting fiber bundles longitudinally with a disk of rotary blade to make the number of single yarns desirable. Although those methods can adjust the number of single yarns by changing the pitch of the rotary blade, it may be difficult to wind up yarns by a bobbin after the longitudinal slitting or to wind off the fiber bundle from the bobbin because the fiber bundles that have been slit longitudinally in full length in the longitudinal direction have lower bundling property. Further, when the fiber bundle is conveyed after the longitudinal slitting, branched fiber bundles caused by the longitudinal slitting might wrap the guide roll or feed roll to make it difficult to convey them.

WO 2012/105080 discloses a method of cutting fibers into a predetermined length at the time of the longitudinal slitting with a fiber separation cutter having a lateral blade orthogonal to the fiber direction in addition to a longitudinal blade capable of slitting longitudinally in parallel with the fiber direction. That method makes it possible to omit winding up the fiber bundles after the longitudinal slitting by the bobbin to be conveyed so that handling is improved. However, the fiber separation cutter provided with the longitudinal blade and the lateral blade has to be replaced as a whole blade when any of the blades comes to the end of their service life.

Furthermore, JP 2011-241494 A and US 2012/0213997 disclose methods of partially separating fiber bundles by pushing a projection of roll onto the fiber bundles, the roll is provided with a plurality of projections on the outer periphery. However, it is difficult to produce a partially separated fiber bundle desirable because the roll circumferential speed is basically the same as the fiber bundle conveyance speed synchronized to each other so that lengths or the like of the separated fiber section and the unseparated fiber section cannot be controlled.

Furthermore, EP 2 687 356 A discloses a special method to form a flow path extending intermittently to make it easy to impregnate fiber bundles with resin by using a monofilament extending orthogonally from the fiber bundle. However, that method relates to a technique of forming a flow path to make it easy to impregnate fiber bundles with resin, but is basically different from separating fiber bundle such as large tow.

To achieve both fluidity at the time of forming and mechanical properties of shaped product, there should be fiber bundles of which number of single yarns is adjusted arbitrarily as described above. Further, even if a fiber bundle of a large tow could be separated into thin fiber bundles of which a number of single yarns is desirable, such separated fiber bundles might aggregate again not to keep the fiber bundle form adjusted to a desirable number of single fiber yarns for some reason. When the fiber bundle form adjusted to a desirable number of single fiber yarns cannot be maintained, it is difficult to prepare a desirable form of intermediate base material for discontinuous fiber bundles by cutting/dispersing the separated fiber bundles to balance the fluidity at the time of forming and mechanical properties of single yarns.

Furthermore, when fiber bundles are not separated properly, it is difficult to stably wind off the separated fiber bundle to be cut from the bobbin or the like by cutting/dispersing the separated fiber bundles to prepare an intermediate base material of the discontinuous fiber bundle while the feed roller or the cutting blade might have problems such as undesirably wrapping the conveyance roller or the cutting blade.

Accordingly, it could be helpful to provide a partially separated fiber bundle and a chopped fiber bundle using the same, as well as a method of manufacturing the same, and a fiber reinforced resin forming material, wherein a forming material is prepared by partially separating fiber bundles to have a desirable number of single yarns applicable to forming a composite material while the partially separated fiber bundles is prevented from aggregating again, wherein excellent process stability and improved productivity are achieved even when the partially separated fiber bundle is subjected to a treatment such as cutting, and wherein a good fluidity at the time of forming, high mechanical properties such as strength and elastic modulus, and a reduced variance are achieved.

SUMMARY

We thus provide:
(1) A partially separated fiber bundle having a surface of a reinforcing fiber coated with a sizing agent containing a water-soluble polyamide-based resin, in which a separated fiber section consisting of a plurality of separated fiber bundles and an unseparated fiber section are provided alternately along a longitudinal direction of the reinforcing fiber bundle consisting of a plurality of single yarns, wherein the reinforcing fiber bundle contains 600 fibers/mm or more and less than 1,600 fibers/mm of fibers per unit width while the reinforcing fiber bundle has a drape level of 120 mm or more and 240 mm or less.
(2) The partially separated fiber bundle according to (1), wherein the sizing agent contains a compound having a functional group of epoxy group, urethane group, amino group or carboxyl group or contains a mixture thereof.

(3) The partially separated fiber bundle according to (1) or (2), wherein the polyamide-based resin is contained in an outermost surface layer of the reinforcing fiber bundle.

(4) The partially separated fiber bundle according to any one of (1) to (3), wherein the partially separated fiber bundle has a hardness of 39 g or more and 200 g or less.

(5) The partially separated fiber bundle according to any one of (1) to (4), wherein the polyamide-based resin is contained in the partially separated fiber bundle by an adhesion amount of 0.1 wt % or more and 5 wt % or less.

(6) The partially separated fiber bundle according to any one of (1) to (5), wherein a width change rate W2/W1 is 0.5 or more and 1.1 or less, where the W1 indicates a width of the reinforcing fiber before being immersed in water while the W2 indicates a width of the reinforcing fiber is immersed in water at 25° C. for 5 minutes and is taken out.

(7) The partially separated fiber bundle according to any one of (1) to (6), wherein a drape level D2 in air of the partially separated fiber bundle immersed in water at 25° C. for 5 minutes is 110 mm or more and 240 mm or less.

(8) The partially separated fiber bundle according to any one of (1) to (7), wherein the separated fiber sections adjacent to each other through one of the unseparated fiber sections have different lengths.

(9) A chopped fiber bundle made by chopping a partially separated fiber bundle according to any one of (1) to (8), wherein a width change rate W4/W3 is 0.6 or more and 1.1 or less, where the W3 indicates a width of the chopped fiber bundle before being immersed while the W4 indicates a width of the chopped fiber bundle which is immersed in water at 25° C. for 5 minutes and is taken out.

(10) The chopped fiber bundle according to (9), wherein the partially separated fiber bundle was chopped at an angle θ with respect to a longitudinal direction, where the angle θ is more than 0° and less than 90°.

(11) A fiber reinforced resin forming material comprising a matrix resin and a chopped fiber bundle according to (9) or (10).

(12) The fiber reinforced resin forming material according to (11), wherein the matrix resin is a polyamide.

(13) A method of manufacturing a partially separated fiber bundle, comprising:
fiber separation step [A] to generate fiber separation parts by stabbing a fiber separation means provided with a plurality of projections into a fiber bundle which consists of a plurality of single yarns and runs along a longitudinal direction;
interlacing step [B] to form an interlaced section at which the single yarns interlace a contact part of the projection in at least one of the fiber separation parts;
partial fiber separation step [C] to take the fiber separation means off the fiber bundle and again stab the fiber separation means into the fiber bundle after passing through an accumulated interlaced section so that separated fiber sections and unseparated fiber sections are formed alternately; and
resin impregnation step [D] to add a water-soluble polyamide to the fiber bundle.

(14) The method of manufacturing a partially separated fiber bundle according to (13), wherein the resin impregnation step [D] is performed after opening and widening the fiber bundle consisting of a plurality of single yarns.

(15) The method of manufacturing a partially separated fiber bundle according to (13) or (14), wherein the fiber separation step [A] is performed after the fiber bundle impregnated with the water-soluble polyamide in the resin impregnation step [D] is subjected to a heat treatment.

(16) The method of manufacturing a partially separated fiber bundle according to (15), wherein the fiber bundle impregnated with the water-soluble polyamide in the resin impregnation step [D] is subjected to the heat treatment at 130° C. to 350° C.

(17) The method of manufacturing a partially separated fiber bundle according to (15) or (16), wherein the fiber bundle impregnated with the water-soluble polyamide in the resin impregnation step [D] is subjected to the heat treatment for 0.33 to 15 minutes.

(18) The method of manufacturing a partially separated fiber bundle according to any one of (13) to (17), wherein the fiber bundle is impregnated with the water-soluble polyamide of 0.1 to 216480 wt % dissolved in a solvent to prepare a polymer solution in the resin impregnation step [D].

(19) The method of manufacturing a partially separated fiber bundle according to any one of (13) to (18), wherein the water-soluble polyamide has a tertiary amino group and/or an oxyethyl-ene group in a main chain and is made by polymerization with diamine and carboxylic acid.

Our partially separated fiber bundle having a surface of reinforcing fiber coated with a water-soluble polyamide, in which a separated fiber section consisting of a plurality of separated fiber bundles and an unseparated fiber section are provided alternately along a longitudinal direction of fiber bundle consisting of a plurality of single yarns, can maintain a desirable condition of partially separated fiber as preventing the fiber bundle partially separated in a desirable manner from re-aggregating. Accordingly, when an intermediate base material for discontinuous chopped fiber bundles to be used to form a composite material is prepared by cutting/dispersing the partially separated fiber bundle maintained in a desirable manner, a desirable range of proportion of thin fiber bundles and thick fiber bundles can be achieved to balance the fluidity at the time of forming and mechanical properties of single yarns.

EXPLANATION OF SYMBOLS

Figure 1:
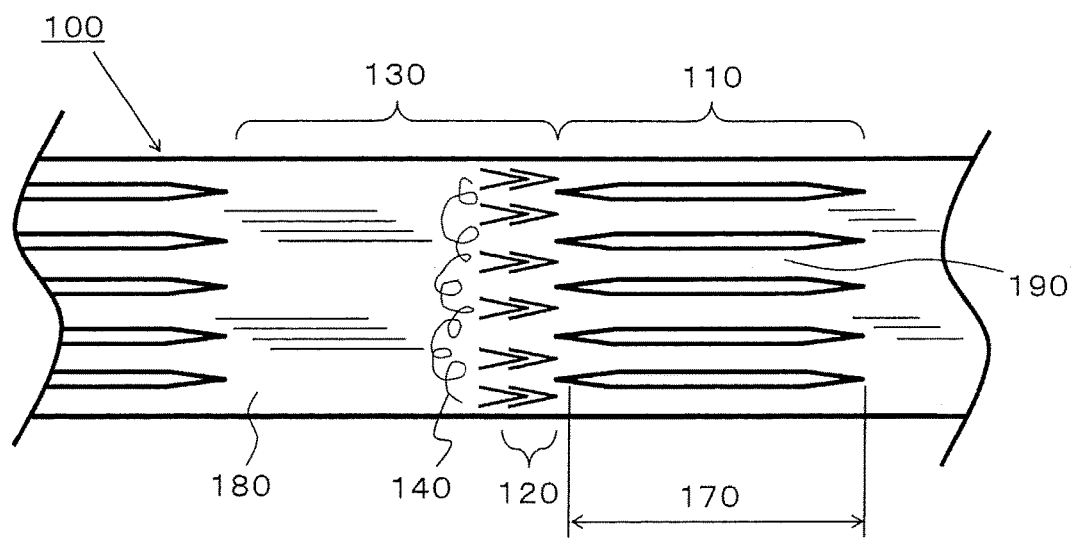
FIG. 1 is a schematic plan view showing an example of our partially separated fiber bundle.

100: fiber bundle
110: separated fiber section
120: accumulated interlaced section
130: unseparated fiber section
140: accumulated fluff
150: fiber separation section
160: interlaced section
170: fiber separation length
180: partially separated fiber bundle
190: separated fiber bundle
200: fiber separation means
210: projection
211: contact part
220: rotary fiber separation means
240: rotary shaft
300: partial fiber separation process
301: fiber bundle widening process
400: sizing agent adding process
401: sizing agent application process
402: drying process
501: cross section
D: cross-section interval
D1: drape level
PA-PK: pattern
RA,RB: running direction of fiber bundle
S1-S6: moving direction of fiber separation means
SA: moving direction of fiber bundle
t: length of side Fy
W: width of fiber bundle
θ: cutting angle
[a]: separated fiber bundle aggregate
[b]: bound fiber bundle aggregate
[c]: bound/cut aggregate

DETAILED DESCRIPTION

Hereinafter, fiber bundles, methods and materials will be explained with reference to the Drawings. This disclosure, however, is not limited to the examples shown in the figures in particular.

First, our partially separated fiber bundles will be explained. Partially separated fiber bundle (A) is a reinforcing fiber bundle coated with application resin (P), in which a separated fiber section consisting of a plurality of separated fiber bundles and an unseparated fiber section are provided alternately along a longitudinal direction of fiber bundle consisting of a plurality of single yarns.

In the partially separated fiber bundle, it is possible that the unseparated fiber section is either continuous or discontinuous in the width direction of the partially separated fiber bundle.

In the partially separated fiber bundle, it is possible that the separated fiber sections adjacent to each other through one of the unseparated fiber sections have the same length or different lengths.

Figure 2:
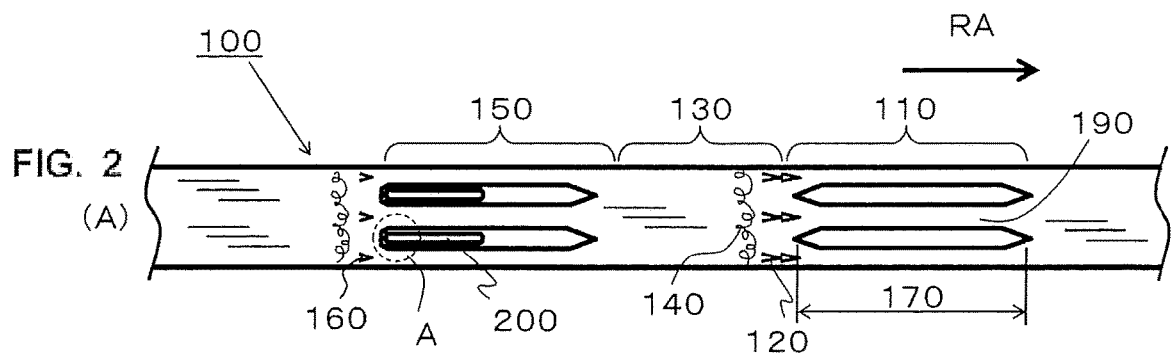
FIGS. 2(A) and 2(B) show an example of fiber separation process [A], where (A) is a schematic plan view and (B) is a schematic side view.
Figure 2:
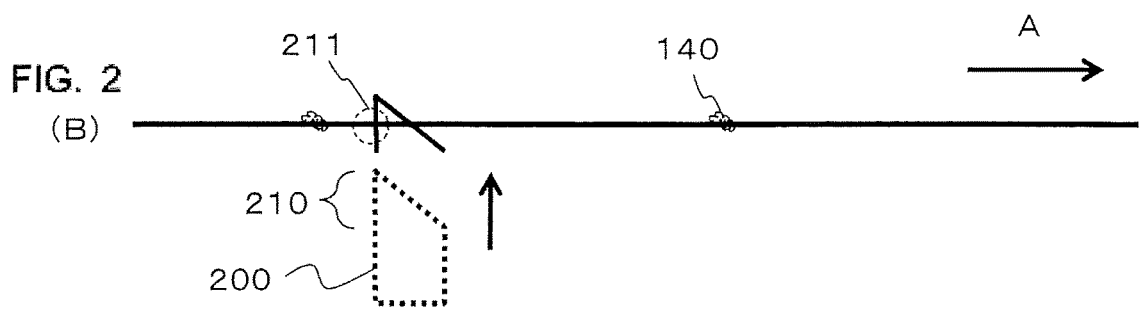

Next, manufacturing methods of our partially separated fiber bundles will be explained. FIG. 1 shows an example of partially separated fiber bundle made by separating a fiber bundle, while FIG. 2 shows an example of the fiber separation process. With reference to FIG. 2, our manufacturing method of partially separated fiber bundle will be explained. FIG. 2 (A) is a schematic plan view showing an example of fiber separation means stabbed to a running fiber bundle while FIG. 2(B) is a schematic side view thereof. In FIG. 2, fiber bundle running direction RA (arrow) indicates the longitudinal direction of fiber bundle 100 which is continuously fed from a fiber bundle feeding device unshown.

Fiber separation means 200 is provided with projection 210 having a projecting shape capable of being stabbed into fiber bundle 100 so that fiber separation part 150 almost parallel to the longitudinal direction of fiber bundle 100 is formed by stabbing fiber separation means 200 into running fiber bundle 100. It is preferable that fiber separation means 200 is stabbed along the side surface of fiber bundle 100. The side face of the fiber bundle means a surface (corresponding to side surface of fiber bundle 100 shown in FIG. 2, for example) orthogonal to the end of a cross section assuming that the cross section of fiber bundle has a flat shape such as horizontally long oval and horizontally long rectangle. Projection 210 may be singular in number in one fiber separation means 200 or may be a plural. When one of fiber separation means 200 is provided with a plurality of projections 210, the frequency of replacing projections 210 having a reduced abrasion frequency can be reduced. Further, a plurality of fiber separation means 200 can be used simultaneously according to the number of fiber bundles to be separated. Fiber separation means 200 can be provided with arbitrarily disposed projections 210 by a parallel, alternate, shifted layout or the like.

When fiber bundle 100 made from a plurality of single yarns is separated into fiber bundles containing less number of fibers by fiber separation means 200, interlaced section 160 consisting of single yarns interlacing around contact part 211 may be formed during the fiber separation process because single yarns have many interlaced parts which are not oriented substantively in the fiber bundle.

Interlaced section 160 may be formed by shifting interlaced single yarns existing preliminarily in the separated fiber section at contact part 211 by fiber separation means 200. Alternatively, interlaced section 160 may be formed by newly producing aggregates of interlaced single yarns by fiber separation means 200.

Our partially separated fiber bundles of reinforcing fiber of which the surface is coated with application resin are bonded to each other so that single yarns generated by abrasion during the fiber separation process and interlaced section 160 are greatly decreased.

After fiber separation part 150 is generated at any part, fiber separation means 200 is taken off fiber bundle 100. Separated fiber section 110 subjected to the fiber separation process is generated by taking off fiber bundle 100 while interlaced sections 160 generated as described above are accumulated at the end of separated fiber section 110 to generate accumulated interlaced section 120. Fiber bundles drop fluff to generate accumulated fluff 140 around accumulated interlaced section 120 during the fiber separation process.

Then, fiber separation means 200 is stabbed into fiber bundle 100 again to generate unseparated fiber section 130 to form partially separated fiber bundle 180 consisting of separated fiber section 110 and unseparated fiber section 130 that are disposed alternately along the longitudinal direction of fiber bundle 100. In our partially separated fiber bundle 180, it is preferable that unseparated fiber section 130 is contained by 3 to 50%. The content of unseparated fiber section 130 is defined as a ratio of total growth length of unseparated fiber section 130 to full length of fiber bundle 100. The content of unseparated fiber section 130 less than 3% may deteriorate fluidity when partially separated fiber bundle 180 is cut/dispersed to be used as intermediate base material of discontinuous fiber bundle while the content of 50% or more may deteriorate mechanical characteristics of shaped product.

As to the length of each section, it is preferable that separated fiber section 110 has a length of 300 mm or more and 1,500 mm or less, while unseparated fiber section 130 has a length of 1 mm or more and 150 mm or less.

It is preferable that fiber bundle 100 has a stable running speed that is preferably constant.

It is preferable that fiber separation means 200 has a sharp shape such as metal needle and thin plate, although it is not limited in particular to the extent that the desired result is achieved. It is preferable that a plurality of fiber separation means are provided in the width direction of fiber bundle 100 subjected to a fiber separation process, in which the number of fiber separation means 200 may be selected according to number F (fibers) of single fiber yarns constituting fiber bundle 100 subjected to the fiber separation process. It is preferable that the number of fiber separation means 200 in the width direction of fiber bundle 100 is (F/10,000-1) or more and less than (F/50-1). When the number is less than (F/10,000-1), mechanical characteristics of fiber reinforced composite material produced may not be improved at a later process. When the number is (F/50-1) or more, yarn breakage and fluff may be caused at the fiber separation process.

The reinforcing fiber bundle is made from a plurality of single yarns that are not limited in particular. It is preferable that the reinforcing fiber bundle is made of at least one selected in a group consisting of carbon fiber, aramid fiber and glass fiber. Each of them may be used solely. Alternatively, two or more kinds thereof may be used in combination. Above all, it is preferable that it is made of carbon fiber capable of providing a composite material excellent in lightness and strength. It is possible that the carbon fiber is a PAN-based carbon fiber or a pitch-based carbon fiber. It is preferable that an average fiber diameter is 3 to 12 μm, preferably 6 to 9 μm.

The carbon fiber is generally available in a roll body (package) of fiber bundle of 3,000 to 60,000 fibers of single yarns made of continuous fiber rolled up with a bobbin. It is preferable that the fiber bundle is non-twisted, although fiber bundles twisted during conveyance or the like can be used. From a viewpoint of low cost of final products, it is preferable to employ a so-called large tow containing many single fibers because the more the number of single yarns is the cheaper the fiber bundle per unit weight is, although the number of single yarns is not limited in particular. The large tow may have a so-called doubled form made by rolling up fiber bundles into a bundle.

It is preferable that the reinforcing fiber is subjected to a surface treatment so that adhesiveness to matrix resin is improved in the fiber reinforced composite material. The surface treatment may be electrolyzation, ozonation, ultraviolet treatment or the like. It is possible that a sizing agent is added so that the reinforcing fiber is prevented from fluffing or the reinforcing fiber is improved in strand bundling property or adhesiveness to matrix resin. The sizing agent may be added in a process different from a process of adding water-soluble polyamide (application resin (P)) at a timing during a production process of our partially separated fiber bundle. The sizing agent, which is not limited in particular, may be a compound having a functional group such as epoxy group, urethane group, amino group and carboxyl group, wherein the compound may have one or more kinds thereof.

It is preferable that a solid adhesion of the sizing agent is 0.01 wt % or more. It is more preferably 0.1 wt % or more, and is further preferably 0.15 wt % or more. It is preferable that a solid adhesion of the sizing agent is less than 4 wt %. It is more preferably less than 3 wt %, and is further preferably less than 2 wt %. The adhesion of sizing agent of less than 0.01 wt % may deteriorate the surface adhesiveness between matrix resin and reinforcing fiber to deteriorate mechanical characteristics of composite material in manufacturing composite materials. The adhesion of sizing agent of more than 4 wt % may cause a bad effect on the adhesiveness between matrix and reinforcing fiber adversely.

It is preferable that a concentration of a polymer solution for sizing to make the sizing agent adhere to the surface of reinforcing fiber bundle is 0.01 wt % or more. It is more preferably 0.05 wt % or more, and is further preferably 0.1 wt % or more. It is preferable that a concentration of a polymer solution for sizing is less than 10%. It is more preferably less than 5 wt %, and is further preferably less than 1 wt %. The polymer solution containing too little an amount of polymer might deteriorate the bundling property of reinforcing fiber bundle because little sizing agent adheres to each monofilament constituting the reinforcing fiber bundle, and may not be able to enhance adhesiveness and affinity between reinforcing fiber and matrix resin so that composite material having good mechanical characteristics can hardly be produced. On the other hand, the polymer solution containing too much amount of polymer may increase viscosity so that the polymer solution might not disperse uniformly to each monofilament constituting reinforcement fiber bundle.

The sizing agent can be added by a well-known method. For example, spray method, roller dipping method, roller transferring method or the like are well known. These methods can be employed solely or in combination. Above all, it is preferable to employ the roller dipping method excellent in productivity and uniformity. When the reinforcing fiber bundle is dipped into the polymer solution, inside of the reinforcing fiber bundle can be impregnated with polymer solution by alternately performing opening and squeezing with a dipping roller provided in the polymer solution bath. The adhesion amount of sizing agent to the reinforcing fiber bundle can be adjusted by adjusting polymer solution concentration and squeezing roller.

It is preferable that the fiber bundle is preliminarily bundled. The preliminarily bundled fiber may be prepared by interlacing single yarns constituting the fiber bundle, by adding sizing agent to the fiber bundle or by forming a twist in a production process of the fiber bundle.

Figure 3:
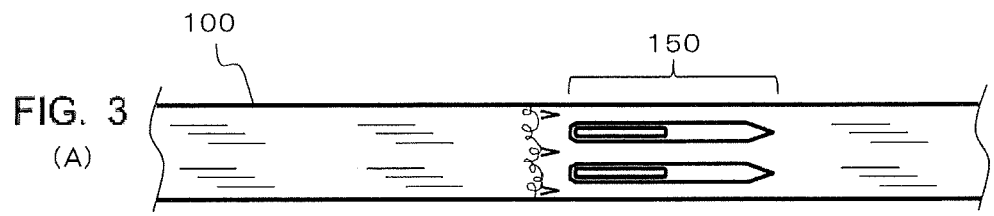
FIGS. 3(A) and 3(B) show an example of moving cycle of fiber separation means in fiber separation process [A], where (A) is a schematic plan view and (B) is a schematic side view.
Figure 3:
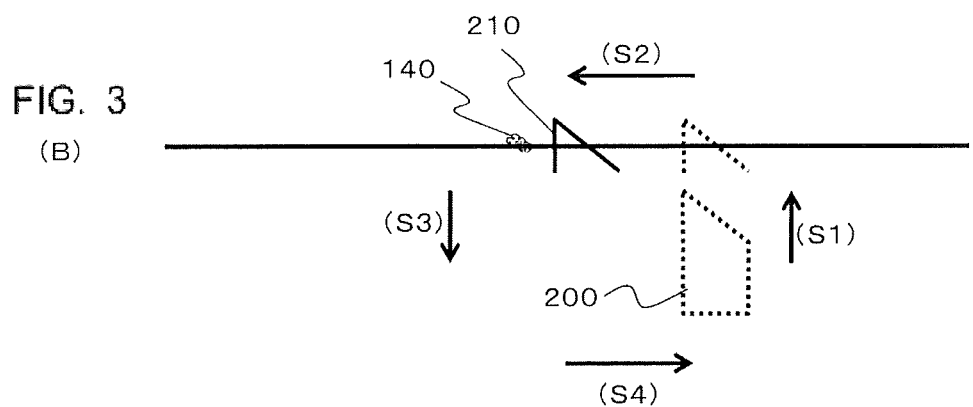
Figure 4:
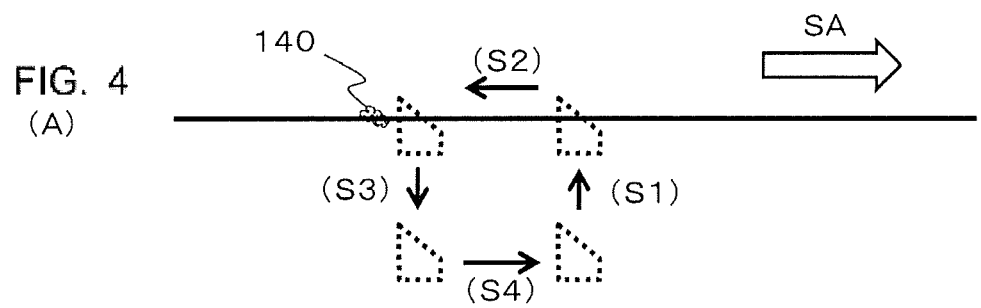
FIGS. 4(A) and 4(B) are a schematic explanation view showing another example of moving cycle of fiber separation means in fiber separation process [A].
Figure 4:
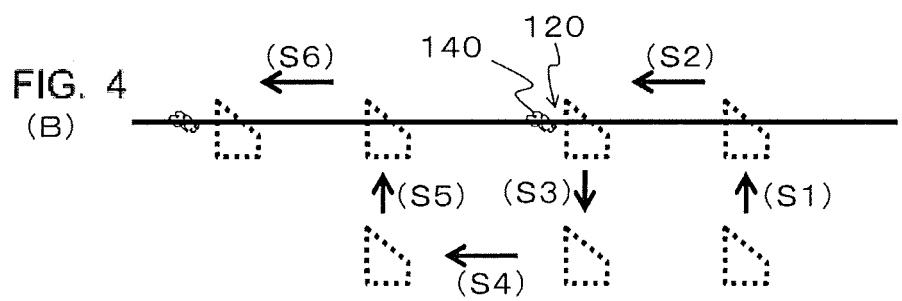

The fiber bundle may not run as shown in FIG. 3, in which fiber separation means 200 is stabbed (arrow (S1)) into fiber bundle 100 standing still, and then fiber separation means 200 runs (arrow (S2)) along fiber bundle 100 to form fiber separation part 150 to take off fiber separation means 200 (arrow (S3)). And then as shown in FIG. 4(A), after fiber bundle 100 is shifted by a predetermined distance at timings of arrow (S3) and arrow (S4), fiber bundle 100 may get back to the initial position (arrow (S4)). Alternatively as shown in FIG. 4(B), fiber separation means 200 may be shifted to pass by accumulated interlaced section 120 (arrow (S4)) while fiber bundle 100 is not shifted.

When fiber bundle 100 is separated as being shifted by a predetermined distance, it is preferable to control the fiber separation time for the process indicated with arrow (S2) as well as the time for the processes indicated with arrows (S3), (S4) and (S1) in which fiber separation means 200 is taken off and then is stabbed into the fiber bundle again, as shown in FIG. 3(B) and FIG. 4(A). In this example, fiber separation means 200 is shifted repeatedly along arrows (S1) to (S4).

In another example when fiber bundle 100 standing still is separated with fiber separation means 200 being shifted to pass by accumulated interlaced section 120, it is preferable to control the fiber separation time for the process indicated with arrow (S2) or arrow (S6) as well as the time for the processes indicated with arrows (S3), (S4) and (S5) or arrows (S3), (S4) and (S1) in which fiber separation means 200 is taken off and then is stabbed into the fiber bundle again, as shown in FIG. 4(B). Even in this example, fiber separation means 200 is shifted repeatedly along arrows (S1) to (S4).

Thus, the separated fiber section and the unseparated fiber section are formed alternately with fiber separation means 200 to produce a partially separated fiber bundle having a predetermined ratio of the unseparated fiber section to the full length of the fiber bundle.

Fiber bundle 100 comprising single yarns interlaced in a specific manner can be separated again around end of the separated fiber section, without leaving the unseparated fiber section having an arbitrary length as shown in FIG. 2 in which a predetermined length of unseparated fiber section 130 is left after forming separated fiber section 110 and then next fiber separation part 150 is formed. When fiber bundle 100 is separated as being shifted intermittently as shown in FIG. 4(A), fiber bundle 100 may be shifted by a distance shorter than the length separated just after being separated (arrow (S2)) with fiber separation means 200 to overlap the position indicated with arrow (S1) to stab fiber separation means 200 again with the separated fiber section separated just before. When the fiber separation is performed with fiber separation means 200 being shifted as shown in FIG. 4(B), fiber separation means 200 may be stabbed into the fiber bundle (arrow (S5)) again without shifting by a predetermined distance (arrow (S4)) after taking off fiber separation means 200 (arrow (S3)).

In such a fiber separation process, since single yarns are not substantively oriented inside fiber bundle 100 comprising a plurality of single yarns interlaced to each other, a separated fiber section can be formed with a gap of fiber separation independently from another separated fiber section formed just before, because fiber separation means 200 tends to slip among single yarns even when fiber separation means 200 is stabbed into an already separated fiber position or the position where fiber separation means 200 is taken off.

It is preferable that the separated fiber section formed per fiber separation process has a length (fiber separation length 170) of 30 mm or more and less than 1,500 mm, although it might change according to the interlacing single yarns of fiber bundle to be separated. The length of less than 30 mm might have insufficient effect of fiber separation while the length of 1,500 mm or more might cause yarn breakage or fluffing for some reinforcing fiber bundle.

Further, a plurality of separated fiber sections and the unseparated fiber sections formed alternately can be provided along the width direction of fiber bundle by using a plurality of fiber separation means 200. A plurality of fiber separation means 200 can be arranged parallelly or alternately, or alternatively phase thereof can be shifted so that a plurality of projections 210 are disposed arbitrarily.

Further, plurality of projections 210 can be controlled independently. It is preferable that each projection 210 is subjected to a fiber separation process independently, according to time required for the fiber separation process or pressing force detected by projection 210, as described later.

The fiber bundle is wound off a winding device (not illustrated) or the like provided at upstream side in the running direction of fiber bundle. The fiber bundle may be wound off by a winding method such as lateral winding method to pull it out in the direction orthogonal to the rotation axis of bobbin and a longitudinal winding method to pull it out in the same direction as the rotation axis of bobbin (paper pipe). From a viewpoint of less release twist, it is preferable to employ the lateral winding method.

Furthermore, the bobbin can be provided in any positional direction at the winding off. When the bobbin stabbed into a creel is provided in a positional direction that end face of the bobbin at a side other than the surface fixing creel rotary shaft is directed to a direction other than the horizontal direction, it is preferable that a predetermined tension is applied to the fiber bundle to hold the bobbin. When the tension is not applied to the fiber bundle, the fiber bundle may fall off the package (roll body made by fiber bundle rolled up with bobbin) or alternatively the fiber bundle fallen off the package may be rolled up with the creel rotary shaft to make it difficult to wind off.

The package may be wound off by a surface winding method to wind the fiber bundle off the package rolling on two rollers provided in parallel with each other as well as the package, other than the above-described method using the creel.

When winding method using the creel, tension may be applied to fiber bundle to be wound off by braking the creel attached to a belt of which an end is fixed while the other end is pulled by a weight or spring. In this example, it is effective to change the brake force according to the winding diameter to stabilize tension.

The number of single yarns of separated fiber can be adjusted by either widening the fiber bundle or adjusting the pitch of a plurality of fiber separation means disposed along the width direction of fiber bundle. When so many fiber separation means are provided along the fiber bundle width direction by a small pitch of fiber separation means, a so-called thin bundle having a smaller number of single yarns can be prepared in the fiber separation process. Instead of narrowing the pitch of fiber separation means, the number of single yarns may also be adjusted by widening the fiber bundle before the fiber separation process to separate the widened fiber bundle with more fiber separation means.

The "widening" means a process of increasing the width of fiber bundle 100. The widening process is not limited in particular, and is preferably a vibration widening method to make it pass through a vibration roll or an air widening method to blow compressed air to it.

It is preferable that widening fiber bundle 100 comprises fibers having a fiber number per unit width of 600 fibers/mm or more. It is more preferably 700 fibers/mm or more, and is further preferably 800 fibers/mm or more. It is preferable that the fiber number per unit width is less than 1,600 fibers/mm. It is more preferably less than 1,400 fibers/mm, and is further preferably less than 1,250/mm. The fiber number per unit width of less than 600 fibers/mm may cause a cracked fiber bundle so that the fiber bundle cannot be separated by a desirable width. It may also generate many fluffs to deteriorate the process passability. The fiber number per unit width of 1,600 fibers/mm or more may deteriorate the winding characteristics of bobbin or deteriorate the process passability because of increased resistance in the fiber separation process.

Fiber separation part 150 is formed by repeatedly stabbing and taking off fiber separation means 200. It is preferable that fiber separation means 200 is stabbed again at a timing set as elapsed time after having taken off it. As well, it is preferable that fiber separation means 200 is taken off again at a timing set as elapsed time after having stabbed it. When the timings of the stabbing and/or taking off are set as the elapsed time, predetermined lengths of separated fiber section 110 and unseparated fiber section 130 can be formed by an arbitrary ratio of separated fiber section 110 to unseparated fiber section 130. The predetermined elapsed time may be constant or elongated or shortened according to the distance to progress the fiber separation. It may change according to the condition of the fiber bundle. For example, the predetermined elapsed time may be shortened if the fiber bundle initially has few interlaced fluffs or single yarns.

When fiber separation means 200 is stabbed into fiber bundle 100, projection 210 is continuously pushed by interlaced section 160 formed as the fiber separation process elapses so that fiber separation means 200 receives pressing force from interlaced section 160.

As described above, a plurality of single yarns have many interlaced parts that are not oriented substantively in fiber bundle 100 while there may be both a part containing many interlaces and a part containing few interlaces in the longitudinal direction of fiber bundle 100. The pressing force may be rapidly increased in the part containing many interlaces of single yarns. On the other hand, the pressing force may be slowly increased in the part containing few interlaces. Therefore, it is preferable that fiber separation means 200 is provided with a pressing force detection means to detect a pressing force from fiber bundle 100.

Since the tension of fiber bundle 100 may change at fiber separation means 200, it is possible that a tension detection means to detect a tension of fiber bundle 100 is provided around fiber separation means 200. It is possible to calculate a difference of tensions detected with a plurality of the tension detection means. The above-described detection means of pressing force, tension and difference of tensions may be provided separately or in combination thereof. It is preferable that the tension detection means is provided at a position distant from fiber separation means 200 by 10 to 1,000 mm forward or backward in the longitudinal direction of fiber bundle 100.

It is preferable that fiber separation means 200 to be taken off is controlled according to a detected value of the pressing force, tension or difference of tensions. It is preferable that fiber separation means 200 is controlled to be taken off when the detected value exceeds a predetermined upper limit. It is preferable that the upper limit of the pressing force or tension is set to 0.01 to 5 N/mm while the upper limit of difference of tensions is set to 0.01 to 0.8 N/mm. The upper limit may be fluctuated within ±10% according to the condition of fiber bundle. The unit [N/mm] of the pressing force, tension and difference of tensions corresponds to a force acting per unit width of fiber bundle 100.

When the upper limit of the pressing force, tension or difference of tensions is set lower than the preferable range, separated fiber section 110 becomes too short to form a sufficient length of separated fiber in the fiber bundle because the pressing force, tension or difference of tensions soon arrives at the upper limit to take off fiber separation means 200. When the upper limit is set greater than the preferable range, single yarns may increasingly break out of fiber bundle 100 before the pressing force, tension or difference of tensions arrives at the upper limit to take off fiber separation means 200 so that defects such as many fluffs and branched fiber bundle subjected to the fiber separation process might be caused. The branched fiber might be rolled up on a conveying roll while the fluff might deposit on a drive roll to make fiber bundle slip to cause conveyance defects.

Unlike the example of controlling fiber separation means 200 to be taken off at a timing set as elapsed time, the detection of pressing form, tension or difference of tensions can make it possible to take off fiber bundle 100 before a force capable of breaking fiber bundle 100 in the fiber separation process is applied so that the fiber separation process can be performed continuously without unreasonable force applied to fiber bundle 100.

From a viewpoint of preparing fiber bundle 100 including long separated fiber section 110 and accumulated interlaced section 120 having a shape stable in the longitudinal direction as preventing fiber bundle 100 from being partially cut into branches or fluffs, it is preferable that the pressing force is 0.04 to 2.0 N/mm, the tension is 0.02 to 0.2 N/mm and the difference of tensions is 0.05 to 0.5 N/mm.

It is preferable that an imaging means to detect a twist in fiber bundle 100 is provided at a position distant from fiber separation means 200 stabbed into fiber bundle 100 by 10 to 1,000 mm forward or backward in the longitudinal direction of fiber bundle 100. With such an imaging, location of the twist can be identified in advance so that fiber separation means 200 is not stabbed into the twist by mistake. Further, fiber bundle 100 can be prevented from narrowing by taking off fiber separation means 200 when the twist approaches fiber separation means 200 stabbed so that the twist is not subjected to the fiber separation process. The mistake means that fiber separation means 200 is stabbed into the twist only to move fiber bundle 100 along the stabbing direction of fiber separation means 200 without successful fiber separation.

When a plurality of fiber separation means 200 equally-spaced are provided along the width direction of fiber bundle 100, the number of separated single yarns changes according to the width change of fiber bundle 100 so that the fiber separation process cannot be performed stably in terms of the number of single yarns. When the twist is forced to be separated, many fluffs may be generated by cutting single yarns of fiber bundle 100 so that accumulated interlaced section 120 consisting of interlaced section 160 accumulated is enlarged. Such an enlarged accumulated interlaced section 120 tends to catch on fiber bundle 100 being unwound from a roll.

When the twist of fiber bundle 100 is detected, it is possible to change the running speed of fiber bundle 100 instead of the above-described control of fiber separation means 200 not to be stabbed into the twist. Specifically, to efficiently prevent the twist, the running speed of fiber bundle 100 can be increased when fiber separation means 200 is taken off fiber bundle 100 until the detected twist passes by fiber separation means 200.

It is possible that an image arithmetic processing means to perform an arithmetic processing of image taken by the imaging means is further provided with a pressing force control means to control the pressing force of fiber separation means 200. With such a configuration, the twist can be improved in passability at the time when the fiber separation means passes by the twist detected by the image arithmetic processing means. Specifically, it is preferable that fiber separation means 200 is controlled to decrease a pressing force just before projection 210 contacts the twist detected by the imaging means until it passes by the twist. It is preferable that the pressing force is decreased to 0.01 to 0.8 times of the upper limit when the twist is detected. The pressing force of less than the preferable range may not be detected substantively so that the pressing force is difficult to control or the control device has to be improved in detection precision. The pressing force of more than the preferable range may increase the frequency to separate the twist so that fiber bundles become thinner.

Figure 5:
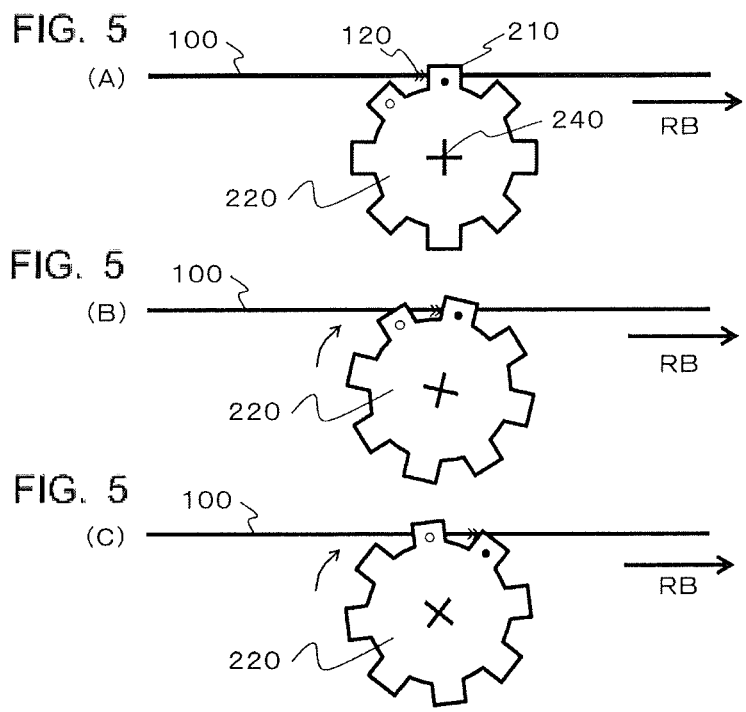
FIGS. 5(A)-5(C) are an explanation view showing an example of moving cycle of rotary fiber separation means to be stabbed in fiber separation process [A].

Rotary fiber separation means 220 is preferably employed as a fiber separation means instead of simply stabbing fiber separation means 200 having projection 210 into fiber bundle 100. FIG. 5 is an explanation view showing an example of moving cycle of rotary fiber separation means to be stabbed. Rotary fiber separation means 220 has a rotary mechanism with rotary shaft 240 orthogonal to the longitudinal direction of fiber bundle 100 while projection 210 is provided on the surface of rotary shaft 240. In FIG. 5, the fiber separation starts by stabbing projection 210 of rotary fiber separation means 220 into fiber bundle 100 while fiber bundle 100 runs along running direction of fiber bundle RB (arrow). It is preferable that rotary fiber separation means 220 is provided with a pressing force detection mechanism and a rotation-stopping position holding mechanism. With such mechanisms, the fiber separation continues as holding the rotation-stopping position shown in FIG. 5(A) until a predetermined pressing force acts on rotary fiber separation means 220. Rotary fiber separation means 220 starts to rotate as shown in FIG. 5(B) when interlaced section 160 is formed on projection 210 to increase the pressing force over a predetermined level. Then, as shown in FIG. 5(C), projection 210 (black dot) comes out of fiber bundle 100 to make next projection 210 (white dot) stab into fiber bundle 100. Because the unseparated fiber section becomes shorter when the operations shown in FIGS. 5(A) to 5(C) are finished in a shorter time, it is preferable that the operations shown in FIGS. 5(A) to 5(C) are finished in a short time so that the separated fiber section of fiber bundle is longer.

When rotary fiber separation means 220 is provided with many projections 210, fiber bundle 100 having a great ratio of fiber separation can be obtained and life of rotary fiber separation means 220 can be extended. The fiber bundle having a great ratio of fiber separation means a fiber bundle in which length separated is long or a fiber bundle in which generation frequency of separated fiber section and unseparated fiber section is enhanced. The more the number of projections 210 in a rotary fiber separation means is, the longer the life of the rotary fiber separation means becomes by reducing frequency of abrasion of projection 210 contacting fiber bundle 100. It is preferable that the number of projections 210 equally-spaced in a disk-like outer periphery is 3 to 12, preferably 4 to 8.

To make fiber bundle 100 have a stable width from viewpoints of fiber separation ratio and life of projection, it is preferable that rotary fiber separation means 220 is provided with an imaging means to detect a twist. Specifically, the fiber bundle width can be stabilized by a configuration in which rotary fiber separation means 220 performs a fiber separation by intermittently repeating to rotate and suspend at normal time until the imaging means detects a twist and once a twist is detected the rotation speed of rotary fiber separation means 220 is increased from the normal time and/or the suspension time is shortened.

The suspension time may be zero so that the rotation continues without suspension.

Instead of the method of intermittently repeated rotation and suspension, it is possible that rotary fiber separation means 220 continues to rotate. In this example, it is preferable that the running speed of fiber bundle 100 is relatively faster or slower than the rotation speed of rotary fiber separation means 220. When the speeds are the same, the fiber separation process may be performed insufficiently because of weak fiber separation to fiber bundle 100 although separated fiber section is formed by the operation of stabbing/taking off projection 210 into fiber bundle 100. However, when the speeds are too much different relatively, the frequency of contact between fiber bundle 100 and projection 210 may increase to cause yarn breakage derived from abrasion to deteriorate continuous productivity.

Our manufacturing device may be provided with a reciprocating mechanism to reciprocate fiber separation means 200 and rotary fiber separation means 220 for stabbing and taking off fiber separation means 200 and rotary fiber separation means 220. It is preferable that our manufacturing device is provided with a reciprocating mechanism to reciprocate fiber separation means 200 and rotary fiber separation means 220 along a feeding direction of fiber bundle 100. The reciprocating mechanism may comprise a direct acting actuator such as pneumatic or electric cylinder and slider.

It is preferable that the number of separated fiber sections in the reinforcing fiber bundle is (F/10,000-1) or more and less than (F/50-1) in a width direction, wherein F indicates the total number (fibers) of single yarns constituting the fiber bundle subjected to a fiber separation. When the number of separated fiber sections existing in a width direction is (F/10,000-1) or more, the end of reinforcing fiber bundle in a discontinuous fiber reinforced composite material made by cutting the partially separated fiber bundle to have a predetermined length is split finely so that the discontinuous fiber reinforced composite material excellent in mechanical characteristics can be obtained. A continuous fiber of the partially separated fiber bundle used without cutting becomes a starting point of impregnating reinforcing fiber bundle with resin from a region including many separated fiber sections so that forming time can be shortened and voids or the like in the fiber reinforced composite material can be reduced. When the number of separated fiber sections is less than (F/50-1), obtained partially separated fiber bundle is prevented from causing yarn breakage as well as deteriorating mechanical characteristics in the fiber reinforced composite material.

When the separated fiber section is provided along the longitudinal direction of fiber bundle 100 according to a certain periodicity or regularity, discontinuous fiber made by cutting the partially separated fiber bundle to have a predetermined length at a later process can be controlled to have a predetermined number of separated fiber bundles.

Next, application resin (P) attached to partially separated fiber bundle (A) will be explained. Application resin (P) is a water-soluble bundling agent of reinforcing fiber bundle chiefly containing a water-soluble polyamide. The water-soluble polyamide has tertiary amino group and/or oxyethylene group in main chain and is made by polycondensation with diamine and carboxylic acid. It is preferable that the diamine is a monomer having a piperazine ring, and a tertiary amino group in main chain such as N,N'-bis (γ-amino propyl) piperazine and N-(β-aminoethyl) piperazine, alkyl diamine having an oxyethylene group in main chain such as oxyethylene alkylamine or the like. The dicarboxylic acid may be adipic acid, sebacic acid or the like.

The water-soluble polyamide may be a copolymer. The copolymer component may be a lactam such as α-pyrrolidone, α-piperidone, ε-caprolactam, α-methyl-ε-caprolactam, ε-methyl-ε-caprolactam, ε-laurolactam or the like. The copolymer may be a binary or multicomponent copolymer although the copolymerization ratio should be selected so that a good water-solubility is maintained. From a viewpoint of complete water-solubility of polymer, it is preferable that the copolymerization ratio of a component having a lactam ring is 30 wt % or less.

A polymer having a poor water solubility and a copolymerization ratio outside the preferable range can be used when the solution is made acidic with organic or inorganic acid to exhibit water-solubility. The organic acid may be acetic acid, chloroacetic acid, propionic acid, maleic acid, oxalic acid, fluoroacetic acid or the like while the inorganic acid may be a general mineral acid such as hydrochloric acid, sulfuric acid, phosphoric acid or the like.

The water-soluble polyamide may be used as a primary sizing agent to be added to reinforcing fibers to which the sizing agent has never been added, or may be used as a secondary sizing agent to be added to reinforcing fibers to which the sizing agent has been added.

It is preferable that the water-soluble polyamide has a solid adhesion of 0.1 wt % or more. It is preferably 0.3 wt % or more, and is further preferably 0.5 wt % or more. It is preferable that the water-soluble polyamide has a solid adhesion of 5 wt % or less. It is preferably 4 wt % or less, and is further preferably 3 wt % or less. When the water-soluble polyamide has a solid adhesion of less than 0.1 wt %, the produced composite material tends to deteriorate in surface adhesiveness between matrix and reinforcing fiber so that the composite material might exhibit poor characteristics. Further, fluff generated from branched filament may deteriorate winding out of the bobbin, or may wrap a nip roller or cutter blade. When the water-soluble polyamide has a solid adhesion of more than 5 wt %, fiber bundles may be hardened too much with deteriorated flexibility so that winding by the bobbin and winding out of the bobbin might not be performed smoothly. Further, yarn breakage may be caused at the time of cutting not to achieve an ideal chopped fiber formation. When the sizing agent has never been added to the reinforcing fiber, it is preferable that the sizing agent is added by the above-described preferable amount of adhesion of the water-soluble polyamide.

When the solid adhesion of water-soluble polyamide is 0.1 wt % or more and 5 wt % or less, productivity can be improved with the effects such as improved winding property out of the bobbin and suppressed wrapping on the nip roller and cutter blade. Further, the holding property for predetermined bundle formation can be improved with suppressed breakage and single yarn dispersion of the chopped fiber bundle. Accordingly, the distribution of the number of single yarns constituting chopped fiber bundle aggregate [N] in which chopped fiber bundles are dispersed can be narrowed to prepare a chopped fiber bundle having a uniform and desirable formation. Because the fiber bundles have plain orientation inside, mechanical characteristics can be improved. Further, because variance of basis weight of bundle aggregate [N] can be decreased, variance of mechanical characteristics of shaped product can be decreased.

Our desirable partial fiber separation process makes it possible to easily and efficiently provide a desirable partially separated fiber bundle by continuously and stably slitting fiber bundles. Particularly, our manufacturing method of partially separated fiber bundle can perform a continuous slitting process of fiber bundles containing twists or having the number of single yarns of large tow, regardless of the replacement life of the rotary blade. Further, cheap large tow can be subjected to a continuous slitting process to reduce material and manufacturing cost of shaped products.

When the sizing agent has been added to the reinforcing fiber bundle by the above-described preferable range of adhesion of the sizing agent, it is preferable that the total adhesion amount of the primary sizing agent and the secondary sizing agent is 0.11 wt % or more and 9 wt % or less. It is more preferably 0.2 wt % or more and 6 wt % or less, and is further preferably 0.5 wt % or more and 3 wt % or less.

It is preferable that the water-soluble polyamide is homogeneously added to the surface of reinforcing fiber. To homogeneously add it, it is possible that the fiber bundle is immersed through a roller in a sizing solution made of water, alcohol or acidic water solution dissolving the water-soluble polyamide of 0.1 wt % or more and 20 wt % or less. It is preferably 1 wt % or more and 10 wt % or less. It is also possible that the fiber bundle is contacted to a roller attached to the sizing solution or that the sizing solution is blown to spray the fiber bundle. From a viewpoint of conservation of environment, it is preferable that the water-soluble polyamide is dissolved in water. It is preferable that a concentration of the sizing solution, temperature, yarn tension or the like is controlled so that an active component of the sizing agent of a desirable amount is uniformly added to the fiber bundle. Further, it is preferable that the sizing agent is added to the fiber bundle vibrating with ultrasonic wave. The sizing agent may be added by a method described above.

To remove a solvent such as water and alcohol in the water-soluble polyamide added to the reinforcing fiber bundle, it is possible to employ a method of heat treatment, air drying, centrifugal separation or the like. It is preferable to employ heat treatment from a viewpoint of cost saving. The heat treatment may be performed with hot wind, hot plate, roller, infrared heater or the like. Such a heat treatment condition is important from the viewpoints of handling and adhesiveness to matrix material. The water-soluble polyamide added to the fiber bundle is subjected to a heat treatment. It is preferable that the heat treatment is performed at 130° C. or more, preferably 200° C. or more. It is preferable that the heat treatment is performed at 330° C. or less, preferably 280° C. or less. In the above-described preferable range of heat treatment, the water-soluble polyamide loses water solubility. This range of heat treatment makes the water-soluble polymer insoluble and less hygroscopic so that post-processing workability is improved with reduced stickiness of strand of bundled filaments and, therefore, a fiber bundle can be provided with a good contact to matrix material and a good handling property. It is possible that a cross-linking promoter is added to the solvent to lower the heat treatment temperature or shorten the heat treatment time. From a viewpoint of preventing the sizing agent from thermally deteriorating, it is possible that the heat treatment is performed after removing water by drying the fiber bundle at room temperature to 180° C.

It is preferable that the heat treatment of the fiber bundle to which the water-soluble polyamide is added is performed for 0.33 min or more and less than 15 min. It is more preferably 0.4 min or more and less than 10 min, and is further preferably 0.5 min or more and less than 5 min. Although it may depend on the heat treatment temperature, when the heat treatment time is less than 0.33 min, separated fiber bundles might be re-aggregated because of residual solubility of the water-soluble polyamide. Once the fiber bundle is re-aggregated, the formation having a desirable number of single yarns might be difficult to maintain. When the heat treatment time is 15 min or more, the water-soluble polyamide may deteriorate to deteriorate a contact between reinforcing fiber and matrix. The sizing agent made of the water-soluble polyamide resin excellent in affinity to various matrix material greatly improves composite physical properties characteristics. Such an improvement is excellent in contact specifically with polyamide-based resin, polyimide-based resin, polyamide imide-based resin or polyether amide imide-based resin.

The water-soluble polyamide used as the second sizing agent may be added to the reinforcing fiber in the same method as the primary sizing agent, or may be added in a manufacturing process of partially separated fiber bundle. To manufacture a partially separated fiber bundle, it is usual that a sizing agent is added to fiber bundles at a timing in any process such that the sizing agent is dissolved (or dispersed) in solvent (or dispersion media) to prepare a sizing solution to be applied to fiber bundles and then the solvent or the like dried and vaporized is removed. As described later in detail, a partial fiber separation process or a widening process of fiber bundle may be performed between the application process and the drying process.

Next, timings of adding the sizing agent will be explained.

Figure 6:
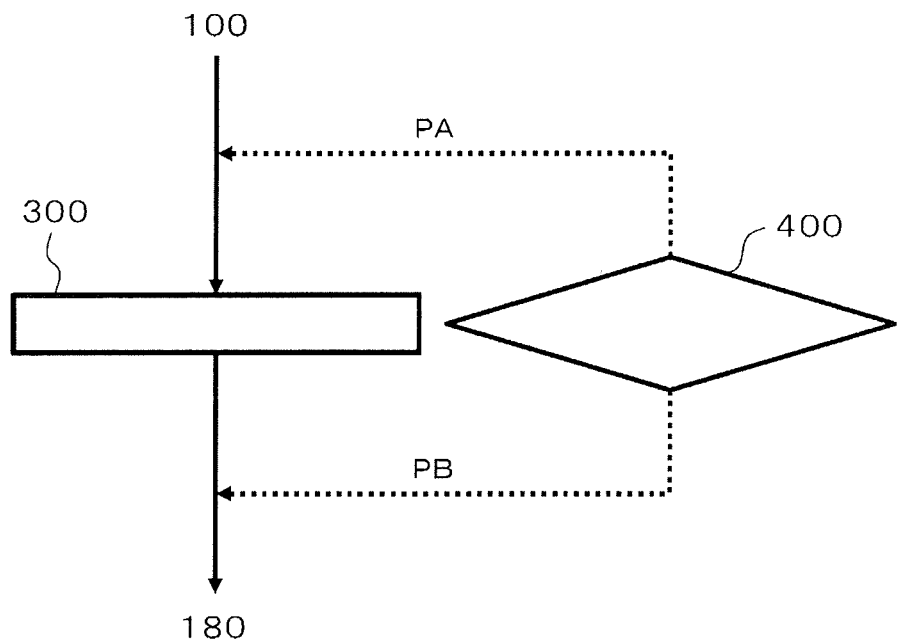
FIG. 6 is an operation flow chart showing an example of timing of sizing agent adding process in our manufacturing method of partially separated fiber bundle.

FIG. 6 shows an example of the timing of the sizing agent adding process in our manufacturing method of partially separated fiber bundles. FIG. 6 shows pattern PA of sizing agent adding process 400 performed before partial fiber separation process 300 and pattern PB of sizing agent adding process 400 performed after fiber separation process 300 in a process to form partially separated fiber bundle 180 through partial fiber separation process 300 from fiber bundle 100. It is possible to employ either timing of pattern PA or pattern PB.

Figure 7:
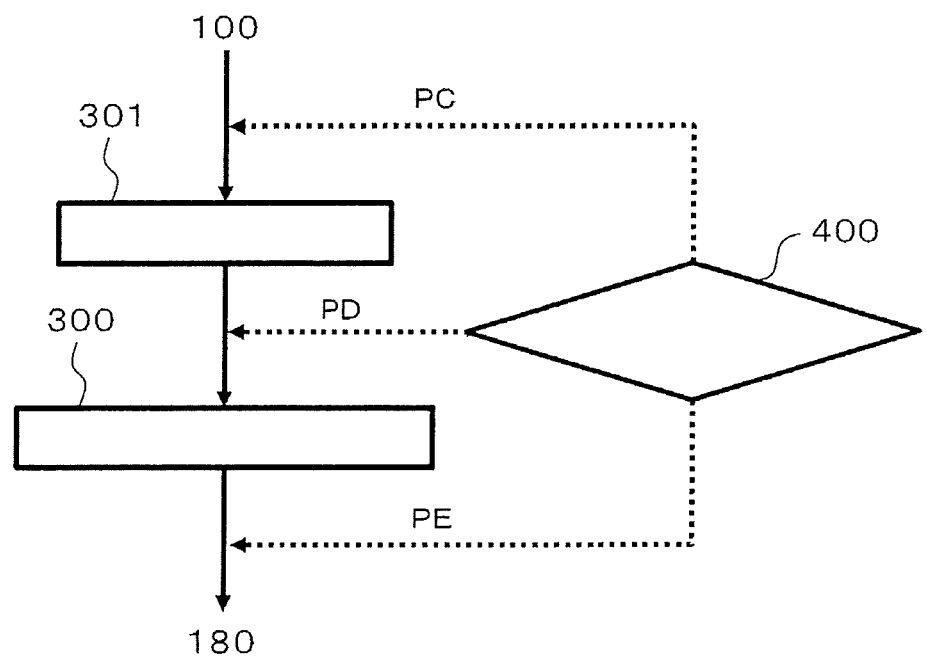
FIG. 7 is an operation flow chart showing an example of timing of sizing agent adding process in a manufacturing method of partially separated fiber bundle including a fiber bundle widening process.

FIG. 7 shows an example of the timing of the sizing agent adding process in a manufacturing method of partially separated fiber bundle including fiber bundle widening process 301. FIG. 7 shows pattern PC of sizing agent adding process 400 performed before fiber bundle widening process 301, pattern PD of sizing agent adding process 400 performed between fiber bundle widening process 301 and partial fiber separation process 300, and pattern PE of sizing agent adding process 400 performed after partial fiber separation process 300 in a process to form partially separated fiber bundle 180 through fiber bundle widening process 301 and partial fiber separation process 300 in this order from fiber bundle 100. From a viewpoint of achieving a desirable partial fiber separation, it is preferable to employ the timing of pattern PD although any one of pattern PC, pattern PD and pattern PE is available.

Figure 8:
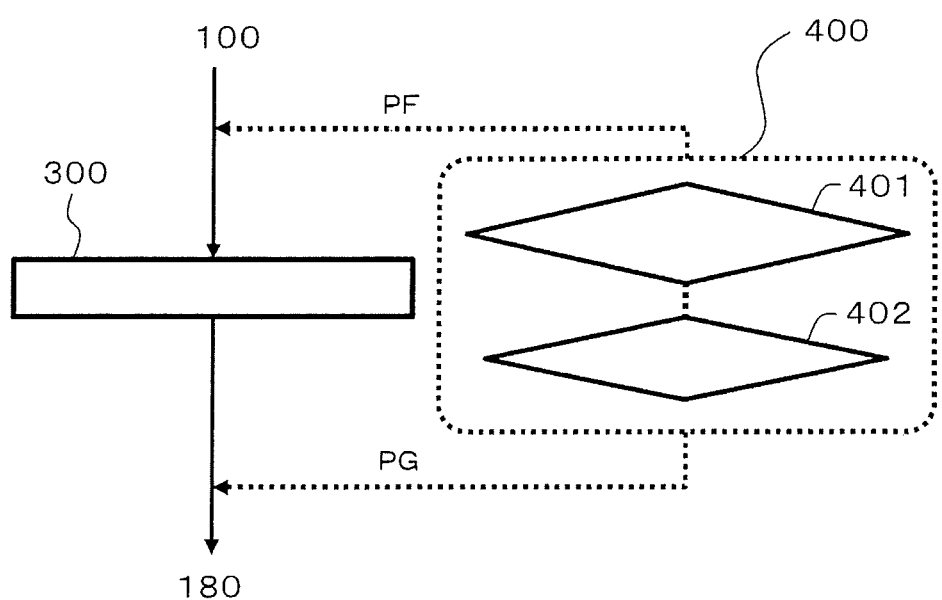
FIG. 8 is an operation flow chart showing an example of timing of sizing agent adding process including sizing agent application process and drying process in our manufacturing method of partially separated fiber bundle.

FIG. 8 shows an example of the timing of the sizing agent adding process including the sizing agent application process and drying process in our manufacturing method of partially separated fiber bundle. FIG. 8 shows pattern PF of sizing agent adding process 400 performed before partial fiber separation process 300 and pattern PG of sizing agent adding process 400 performed after partial fiber separation process 300 in a process to form partially separated fiber bundle 180 through partial fiber separation process 300 from fiber bundle 100, while sizing agent adding process 400 includes sizing agent application process 401 and drying process 402. It is possible to employ either timing of pattern PF or pattern PG. Pattern PF is substantially the same as pattern PA shown in FIG. 6 while pattern PG is substantially the same as pattern PB shown in FIG. 6.

Figure 9:
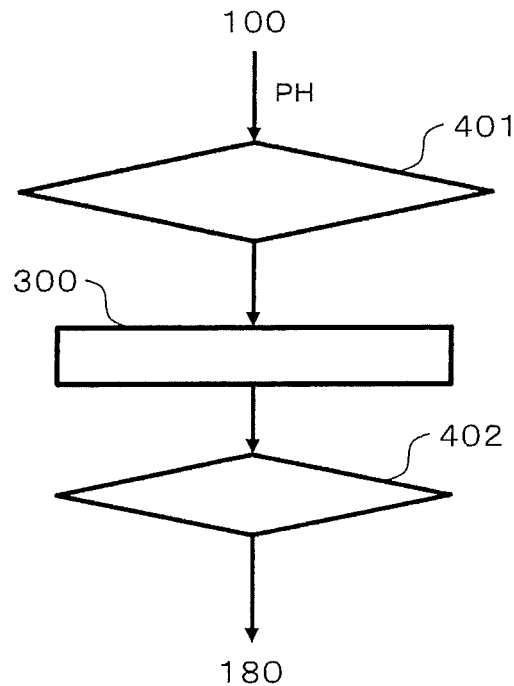
FIG. 9 is an operation flow chart showing another example of timing of sizing agent adding process including sizing agent application process and drying process in our manufacturing method of partially separated fiber bundles.

FIG. 9 shows another example of the timing of the sizing agent adding process including the sizing agent application process and drying process in our manufacturing method of partially separated fiber bundles. FIG. 9 shows pattern PH in which sizing agent application process 401 and drying process 402 in sizing agent adding process 400 are separately performed at different timings. Sizing agent application process 401 is performed before partial fiber separation process 300 while drying process 402 is performed after partial fiber separation process 300.

Figure 10:
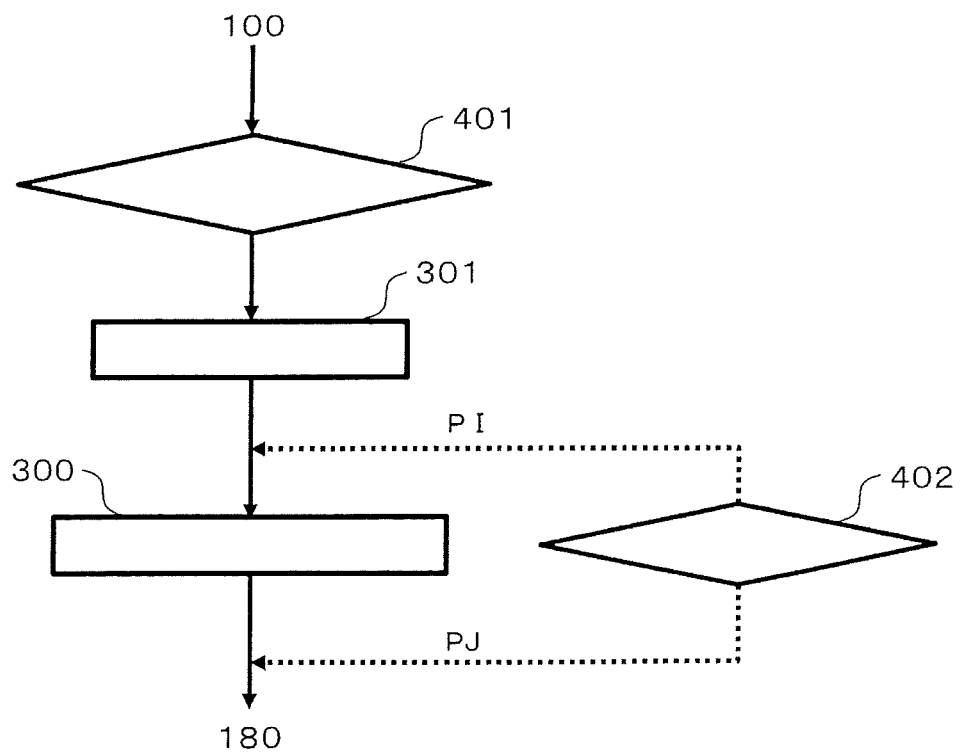
FIG. 10 is an operation flow chart showing an example of timing of sizing agent adding process including sizing agent application process and drying process in a manufacturing method of partially separated fiber bundle including a fiber bundle widening process.

FIG. 10 shows an example of the timing of the sizing agent adding process including the sizing agent application process and drying process in a manufacturing method of partially separated fiber bundle including a fiber bundle widening process, specifically showing pattern PI of drying process 402 performed between fiber bundle widening process 301 and partial fiber separation process 300 and pattern PJ of drying process 402 performed after partial fiber separation process 300 in a process to form partially separated fiber bundle 180 through fiber bundle widening process 301 and partial fiber separation process 300 performed in this order from fiber bundle 100, while sizing agent application process 401 in the sizing agent adding process is performed before fiber bundle widening process 301.

Figure 11:
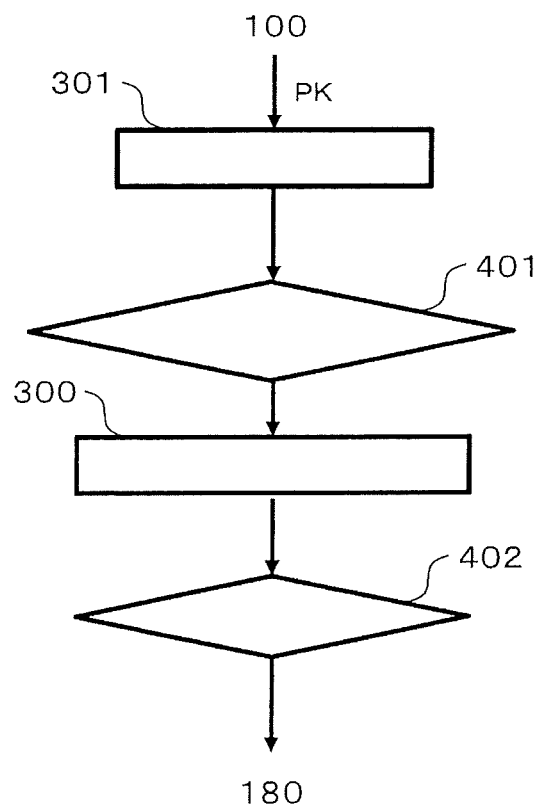
FIG. 11 is an operation flow chart showing another example of timing of sizing agent adding process including sizing agent application process and drying process in a manufacturing method of partially separated fiber bundle including a fiber bundle widening process.

FIG. 11 shows another example of the timing of the sizing agent adding process including the sizing agent application process and drying process in a manufacturing method of partially separated fiber bundle including a fiber bundle widening process, specifically showing pattern PK of drying process 402 performed after partial fiber separation process 300 in a process to form partially separated fiber bundle 180 through fiber bundle widening process 301 and partial fiber separation process 300 performed in this order from fiber bundle 100, while sizing agent application process 401 in the sizing agent adding process is performed between fiber bundle widening process 301 and partial fiber separation process 300.

As described above, the sizing agent may be added at various timings in our manufacturing method of our partially separated fiber bundle.

It is preferable that the partially separated fiber bundle has a drape level D1 (bundle hardness) of 120 mm or more. It is preferably 145 mm or more, and is more preferably 170 mm or more. It is preferable that the partially separated fiber bundle has a drape level D1 (bundle hardness) of 240 mm or less. It is preferably 230 mm or less, and is more preferably 220 mm or less. When drape level D1 is less than 120 mm, filaments might be branched to generate fluff to deteriorate winding out of the bobbin and wrap the nip roller or cutter blade. When drape level D1 is more than 240 mm, fiber bundles might be too much hardened with deteriorated flexibility so that winding by the bobbin and winding out of the bobbin might not be performed smoothly. Further, yarn breakage might be caused at the time of cutting not to achieve an ideal chopped fiber formation. The drape level D1 means a bundle hardness determined by measuring the shortest distance between a side face of a rectangular solid stand and a tip of reinforcing fiber bundle which is not fixed to the stand, 5 minutes after the reinforcing fiber bundle cut into 30 cm length of which part of 5 cm from the other tip is placed on the end of the stand is fixed to the end of the stand so that 25 cm of the reinforcing fiber bundle projects from the end of the stand at 23±5° C.

Next, drape level D2 is determined by the same method as drape level D1, except that the reinforcing fiber bundle has been immersed in water at 25° C. for 5 minutes and been taken out to be dried absolutely. It is preferable that drape level D2 (bundle hardness) is 110 mm or more. It is preferably 145 mm or more, and is more preferably 170 mm or more. It is preferable that drape level D2 (bundle hardness) is 240 mm or less. It is preferably 230 mm or less, and is more preferably 220 mm or less. When drape level D2 is less than 110 mm, filaments might be branched to generate fluff to deteriorate winding out of the bobbin and wrap the nip roller or cutter blade. When drape level D1 is more than 240 mm, fiber bundles might be too much hardened with deteriorated flexibility so that winding by the bobbin and winding out of the bobbin might not be performed smoothly. Further, yarn breakage might be caused at the time of cutting not to achieve an ideal chopped fiber formation.

It is preferable that our partially separated fiber bundle has a hardness of 39 g or more. It is more preferably 70 g or more, and is further preferably 120 g or more. It is preferable that our partially separated fiber bundle has a hardness of 200 g or less. It is more preferably 190 g or less. The hardness of partially separated fiber bundle means a hardness to be determined by generally known "Handle-O-Meter" method to measure a resisting force as a hardness of a carbon fiber bundle placed on a test stand having a groove (20 mm) into which a test piece is pressed up to a predetermined depth (8 mm). When the hardness of partially separated fiber bundle is less than 39 g, filaments might be branched to generate fluff to deteriorate winding out of the bobbin and wrap the nip roller or cutter blade. When it is more than 200 g, the desired result cannot be achieved because of decreased winding characteristics of winder for the partially separated fiber bundle.

It is preferable that the resin-containing reinforcing fiber bundle before being separated to prepare our partially separated fiber bundle has a width change rate W2/W1 of 0.5 or more, where W1 indicates a width of the resin-containing reinforcing fiber before being immersed in water while W2 indicates a width of the resin-containing reinforcing fiber which is immersed in water at 25° C. for 5 minutes and is taken out to be drained for 1 minute. It is more preferably 0.6 or more, and is further preferably 0.7 or more. It is preferable that a width change rate W2/W1 is 1.1 or less. When the width change rate of the resin-containing reinforcing fiber bundle is less than 0.5, separated fiber bundles might be re-aggregated because of residual solubility of the water-soluble polyamide. Once the fiber bundle is re-aggregated, the formation having a desirable number of single yarns may be difficult to maintain. When the fiber bundle form adjusted to a desirable number of single fiber yarns cannot be maintained, it is difficult to prepare a desirable form of intermediate base material for discontinuous fiber bundles to be used to form a composite material by cutting/dispersing the separated fiber bundles to balance the fluidity at the time of forming and mechanical properties of single yarns. When the width change rate W2/W1 of the resin-containing reinforcing fiber bundle is more than 1.1, fiber bundles may be too hardened with deteriorated flexibility so that winding by the bobbin and winding out of the bobbin might not be performed smoothly. Further, yarn breakage might be caused at the time of cutting not to achieve an ideal chopped fiber formation.

Our partially separated fiber bundle having a surface of reinforcing fiber coated with water-soluble polyamide can maintain a desirable condition of partially separated fiber as preventing the fiber bundle partially separated in a desirable manner from re-aggregating. As a result, when such a desirable condition of partially separated fiber bundle is chopped to prepare a forming material used to form a composite material, holding property to a predetermined bundle formation can be improved with suppressed breakage and single yarn dispersion of chopped fiber bundle. Accordingly, a histogram of the number of single yarns constituting chopped fiber bundle in a mat in which chopped fiber bundles are dispersed has a single peak while the bundle distribution can be narrowed to prepare a chopped fiber bundle having a uniform and desirable formation. It is preferable that the bundle distribution has a standard deviation a of 550 or less. It is more preferably 400 or less. Because the fiber bundles have plain orientation inside by the preferable range of the bundle distribution, mechanical characteristics can be improved. When standard deviation a is more than 550, fiber reinforced resin forming material or fiber reinforced resin shaped product made from the chopped fiber bundle aggregate [N] impregnated with matrix resin [M] might have stress concentration to cause deterioration of mechanical characteristics or variance thereof. The standard deviation a means a standard deviation a calculated by fitting the gauss function to the histogram.

It is preferable that our chopped fiber bundle has a weight average fiber length of 5 mm or more. It is preferably 6 mm or more, and is further preferably 10 mm or more. It is preferable that our chopped fiber bundle has a weight average fiber length of 100 mm or less. It is preferably 50 mm or less, and is further preferably 25 mm or less. When the weight average fiber length of the reinforcing fiber is less than 5 mm, mechanical characteristics of fiber reinforced resin forming material may deteriorate. When the weight average fiber length of the reinforcing fiber is more than 100 mm, the formability may deteriorate.

It is preferable that our chopped fiber bundle has an average bundle width of 0.03 mm or more. It is preferably 0.05 mm or more, and is further preferably 0.07 mm or more. When it is less than 0.03 mm, the forming material may have a poor fluidity. It is preferable that the discontinuous reinforcing fiber bundle constituting a reinforcing fiber mat has an average bundle width of 3 mm or less. It is more preferably 2 mm or less, and is further preferably 1 mm or less. When it is more than 5 mm, the shaped product may have poor mechanical characteristics.

It is preferable that the chopped fiber bundle made by chopping our partially separated fiber bundle has a width change rate W4/W3 of 0.6 or more, where W3 indicates a width of the chopped fiber bundle before being immersed while W4 indicates a width of the chopped fiber bundle immersed in water at 25° C. for 5 minutes and is taken out to be drained for 1 minute. It is more preferably 0.7 or more, and is further preferably 0.75 or more. It is preferable that a width change rate W4/W3 is 1.1 or less. When the width change rate of the chopped fiber bundle is less than 0.6, chopped fiber bundles may be re-aggregated so that the formation having a desirable number of single yarns may be difficult to maintain. When the fiber bundle form adjusted to a desirable number of single fiber yarns cannot be maintained, it is difficult to prepare a desirable form of intermediate base material for discontinuous fiber bundles to balance the fluidity at the time of forming and mechanical properties of single yarns. When it is more than 1.1, it is difficult to prepare an intermediate base material to balance the fluidity at the time of forming and mechanical properties of single yarns.

To chop our partially separated fiber bundle to prepare chopped fibers, well-known chopping method can be employed. For example, a rotary cutter or Guillotine cutter may be used appropriately. In this example, a partially separated fiber bundle may be chopped without winding it or the partially separated fiber bundle wound on a bobbin may be wound off the bobbin and cut. It is preferable that the chopped fiber bundle is chopped by angle θ with respect to the longitudinal direction of the fiber bundle. It is preferable that cutting angle θ is in the range of 0°<θ<90°. It is more preferably 0°<θ<45°, and is further preferably 5°<θ<30°. Such a range of cutting angle can achieve high mechanical characteristics and low variance together with high processability for cutting at a desirable angle without error.

Chopped fiber bundle aggregate [N] formed by randomly dispersing the chopped fiber bundle prepared by chopping as described above may contain at least one kind of aggregate among fiber bundle aggregate [a], bound bundle aggregate [b] and bound/cut aggregate [c], where fiber bundle aggregate [a] is made by separating fiber bundle to be split into an arbitrary bundle number, bound bundle aggregate [b] is made by binding fiber yarns to each other in the fiber bundle through the unseparated fiber section, and bound/cut aggregate [c] is made by chopping the binding between single yarns of fiber bundle at the intersection between the unseparated fiber section and the cross section of the partially separated fiber bundle.

Figure 12:
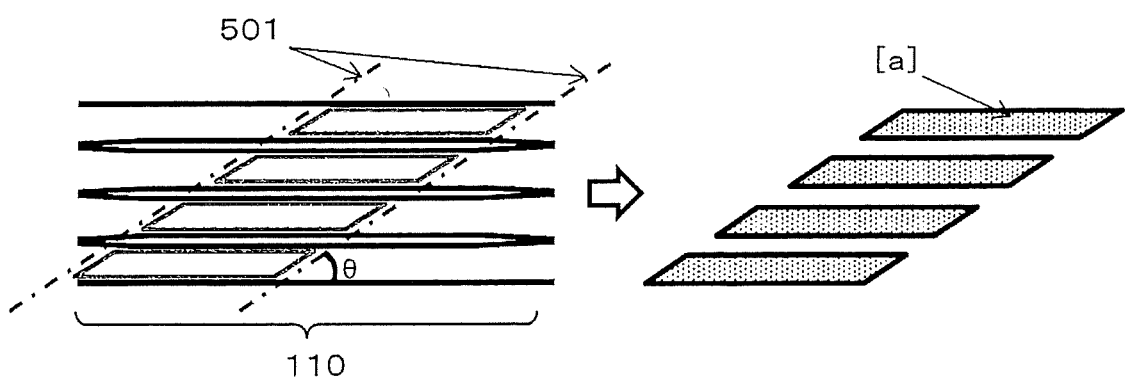
FIG. 12 is a schematic plan view showing an example of preparation method of separated fiber bundle aggregate [a].

FIG. 12 shows a plurality of separated fiber bundle aggregates [a] having a small width and a predetermined length and is made by chopping separated fiber section 110 of partially separated fiber bundle 180 to make cross section 501 oblique with respect to the longitudinal direction of fiber bundle at cutting angle θ (0°<θ<90°).

Figure 13:
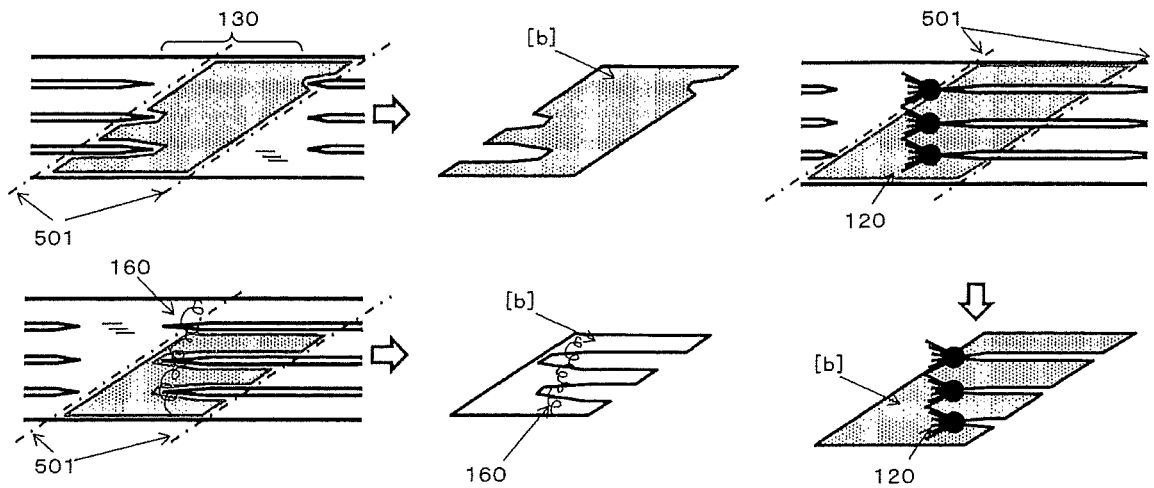
FIG. 13 is a schematic plan view showing an example of preparation method of bound bundle aggregate [b].

FIG. 13 (top left) shows bound bundle aggregate [b] having notches at ends in the longitudinal direction of fiber bundle made by chiefly chopping unseparated fiber section 130 of partially separated fiber bundle 180 to make cross section 501 oblique with respect to the longitudinal direction of fiber bundle at cutting angle θ (0°<θ<90°). FIG. 13 (bottom left) shows bound bundle aggregate [b] having interlaced section 160 and deep notches at an end in the longitudinal direction of fiber bundle made by chopping both unseparated fiber section 130 and separated fiber section 110 having interlaced section 160 of partially separated fiber bundle 180 to make cross section 501 oblique with respect to the longitudinal direction of fiber bundle at cutting angle θ (0°<θ<90°). FIG. 13 (right) shows bound bundle aggregate [b] having accumulated interlaced section 120 and deep notches at an end in the longitudinal direction of fiber bundle made by chopping both unseparated fiber section 130 and separated fiber section 110 having accumulated interlaced section 120 of partially separated fiber bundle 180 to make cross section 501 oblique with respect to the longitudinal direction of fiber bundle at cutting angle θ (0°<θ<90°).

Figure 14:
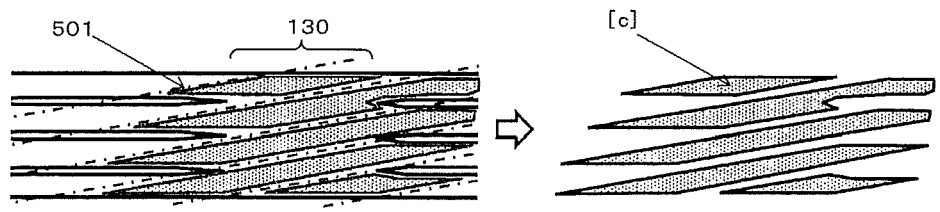
FIG. 14 is a schematic plan view showing an example of preparation method of bound/cut aggregate [c].

FIG. 14 shows bound/cut aggregate [c] having a long average fiber length, a narrow width and a narrower width at ends in the longitudinal direction of fiber bundle made by chiefly chopping unseparated fiber section 130 or chopping a whole length of unseparated fiber section 130 of partially separated fiber bundle 180 to make cross section 501 oblique with respect to the longitudinal direction of fiber bundle at cutting angle θ (0°<θ<90°). In FIG. 14, a binding between single yarns of fiber bundle 100 is chopped at the intersection between unseparated fiber section 130 and cross section 501 made by chopping partially separated fiber bundle 190.

Because bound/cut aggregate [c] has a long average fiber bundle length, when the fiber bundle is chopped or when the aggregates are dispersed, the fiber bundle might have a crack even in the unseparated fiber section to form an aggregate having the smaller number of single yarns. Such a small bundle aggregate is included in bound/cut aggregate [c].

Chopped fiber bundle aggregate [N] may contain at least one kind of aggregate among fiber bundle aggregate [a], bound bundle aggregate [b] and bound/cut aggregate [c]. From a viewpoint of achieving excellent mechanical characteristics and low variance, it is preferable that bundle aggregate [N] has a content of bound bundle aggregate [b] of 0 to 15%. The content means a frequency ratio of bound bundle aggregate [b] in bundle aggregate [N]. Namely, the content is calculated by Formula (1), where N(A) indicates the total number of bundle aggregates [N] while N(b) indicates the number of bound bundle aggregates [b] contained therein:

$$\{N(b)/N(A)\} \times 100 \qquad (1).$$

To produce a fiber reinforced resin forming material containing bundle aggregate [N], it is preferable that the partially separated fiber bundle is chopped to prepare bundle aggregate [N] according to Formula (2):

$$W^* \cos \theta / D \geq 35 \qquad (2)$$

W: fiber bundle width of partially separated fiber bundle at the cutting process D: cross-section interval of bundle aggregate [N].

Figure 15:
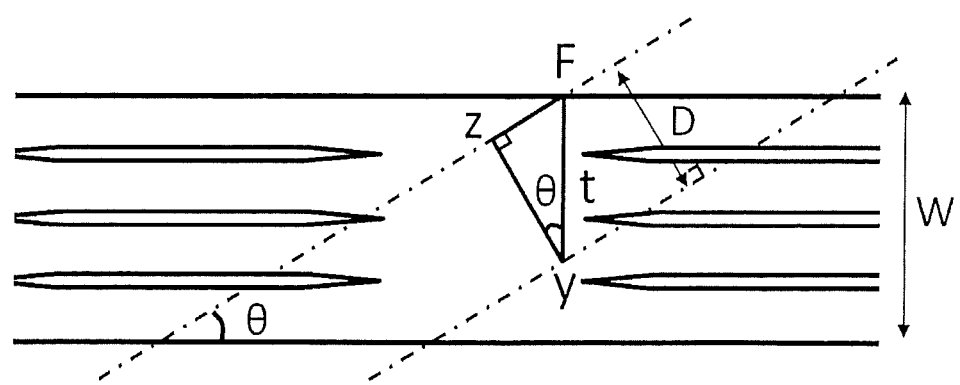
FIG. 15 is a schematic plan view for explaining Formula 2.

As shown in FIG. 15 in which θ indicates cutting angle, W indicates fiber bundle width of partially separated fiber bundle to be chopped, and D indicates an interval of cross sections 501, length t of side Fy of ΔFyz is calculated by the formula "t=D/cos θ" while number W/t of chopping fiber bundle having width W along the cross section is calculated by the formula "W/t≥35" so that Formula (2) is satisfied.

Formula (2) shows that W (fiber bundle width) should be increased for finely chopping bound aggregate [b]. It is also preferable that cutting angle θ (0°<θ<90°) is smaller. Besides there is a limit from viewpoints of bundle formation holding property and processability. Although cross-section interval may be controlled to satisfy Formula (2), it is preferable that D is constant so that target fiber length is stable.

As described above, our chopped fiber bundle aggregate [N] formed obliquely to the longitudinal direction of fiber bundle by chopping our partially separated fiber bundle in which separated fiber sections and unseparated fiber sections are provided alternately can achieve excellent mechanical characteristics (strength and elastic modulus) of shaped product together with suppressed small variance thereof.

Our chopped fiber bundle aggregate [N] can be impregnated with matrix resin [M] which is not limited in particular and may be a thermosetting resin such as epoxy resin, unsaturated polyester resin, vinyl ester resin, phenolic resin, epoxy acrylate resin, urethane acrylate resin, phenoxy resin, alkyd resin, urethane resin, maleimide resin and cyanate resin, a thermoplastic resin such as polyamide resin, polyacetal, polyacrylate, polysulfone, ABS, polyester, acrylic, polybutylene terephthalate (PBT), polyethylene terephthalate (PET), polyethylene, polypropylene, polyphenylene sulfide (PPS), polyetheretherketone (PEEK), a liquid crystal polymer, polyvinyl chloride, silicone and polytetrafluoroethylene as a fluorinated resin. It is preferable that a polyamide-based resin is selected from the thermoplastic resin. It is further preferable that an inorganic antioxidant is blended with polyamide. The thermoplastic polyamide resin may be a ring-opened polymer of cyclic lactam or a polycondensate of ω-aminocarboxylic acid such as nylon 6, nylon 11 and nylon 12, a polycondensate of diamine and dicarboxylic acid such as nylon 610, nylon 612, nylon 6T, nylon 61, nylon 9T, nylon M5T and nylon MFD6, a copolymerized nylon polycondensate of two or more kinds of diamine and dicarboxylic acid such as nylon 66.6.1 and nylon 66.6.12 or the like. From viewpoints of mechanical characteristics and cost, it is preferable to employ nylon 6, 66 or 610.

It is preferable to use copper halide or derivatives thereof such as copper iodide, copper bromide, copper chloride, and complex salt of mercaptobenzimidazole and copper iodide. Above all, it is preferable to employ the complex salt of mercaptobenzimidazole and copper iodide. It is preferable that the copper halide or derivatives thereof is added to 100 parts by weight of thermoplastic polyamide resin by 0.001 to 5 parts by weight. The addition of less than 0.001 parts by weight might not suppress resin decomposition, fume or odor while the addition of more than 5 parts by weight might not improve the effects. From a viewpoint of balance between thermal stability and cost, it is preferably 0.002 to 1 part by weight.

To impregnate chopped fiber bundle aggregate [N] with matrix resin, it is possible that fiber bundle aggregate [N] containing thermoplastic resin fiber is prepared to use the thermoplastic resin fiber as a matrix resin, or alternatively, fiber bundle aggregate [N] containing no thermoplastic resin fiber may be impregnated with matrix resin at any stage of producing fiber reinforced resin forming material.

Fiber bundle aggregate [N] containing thermoplastic resin fiber used as a raw material may be impregnated with matrix resin at any stage of producing fiber reinforced resin forming material. In this example, the matrix resin may be the same as or different from the resin constituting the thermoplastic resin fiber. Even when the matrix resin is different from the resin constituting the thermoplastic resin fiber, it is preferable that they are compatible to each other or alternatively have a high affinity.

To produce a fiber reinforced resin forming material, fiber bundle aggregate [N] may be impregnated with thermoplastic resin as a matrix resin by using an impregnation pressing machine. The pressing machine capable of impregnating matrix resin at a temperature and pressure may be an ordinary pressing machine having a planar platen going up and down or so-called double belt pressing machine having a mechanism of a pair of endless steel belts running. In such an impregnation process, matrix resin having a form such as film and nonwoven or woven fabric sheet may be laminated with discontinuous fiber mat to be melted and impregnated with matrix resin by using the above-described pressing machine. It is also possible that particles of matrix resin are dispersed on bundle aggregate [N] to make a laminate or are dispersed simultaneously with chopped fibers to be blended inside bundle aggregate [N].

It is preferable that the fiber reinforced resin forming material contains reinforcing fiber by 20 to 70 vol % to the total volume. When the content of reinforcing fiber is decreased, the fiber reinforced resin forming material tends to decrease as well. When the content of reinforcing fiber is excessive, formability tends to decrease although mechanical characteristics of fiber reinforced resin forming material may tend to improve. It is preferable that the content of reinforcing fiber is 25 to 50 vol % to the fiber reinforced resin forming material.

EXAMPLES

Hereinafter, Examples and Comparative examples will be explained. This disclosure, however, is not limited to the Examples or Comparative examples in particular.
(1) Raw Materials
Fiber Bundle [A-1]:
Continuous carbon fiber bundle (made by ZOLTEK Corporation, "PX35 (registered trademark)") having fiber diameter of 7.2 μm, tensile elastic modulus of 240 GPa and single yarns of 50,000 is employed.
Sizing Agent [S-1]:
Reactive urethane resin emulsion (made by Dai-ichi Kogyo Seiyaku Co., Ltd., "SUPERFLEX (registered trademark) R5000") is employed.
Application Resin [P-1]:
Water-soluble polyamide (made by Toray Industries, Inc., "T-70") is employed.
Application Resin [P-2]:
Water-soluble polyamide (made by Toray Industries, Inc., "A-90") is employed.
Application Resin [P-3]:
Water-soluble polyamide (made by Toray Industries, Inc., "P-70") is employed.
Application Resin [P-4]:
Water-soluble polyamide (made by Toray Industries, Inc., "P-95") is employed. Matrix resin [M-1]:
Polyamide resin (made by Toray Industries, Inc., "Amilan (registered trademark) CM1001") is employed.
(2) Measurement Method of Adhesion Amount of Sizing Agent or Water-Soluble Polyamide
About 5 g of carbon fiber bundle attached to the sizing agent or the water-soluble polyamide is sampled in a heat resistant container. The container is dried at 80° C. under vacuum condition for 24 hours and then cooled down to room temperature to prevent it from absorbing moisture. After mass m1 [g] of carbon fiber is measured, a whole container is subjected to an ashing process at 450° C. in nitrogen atmosphere. It is cooled down to room temperature to prevent it from absorbing moisture to measure mass m2 [g] of carbon fiber. Through the above-described processes, adhesion amount of sizing agent or water-soluble polyamide is calculated according to the following formula. The measurement results of 10 pieces of fiber bundles are averaged.

Adhesion amount [wt %]=100×{(m1−m2)/m1}

Figure 16:
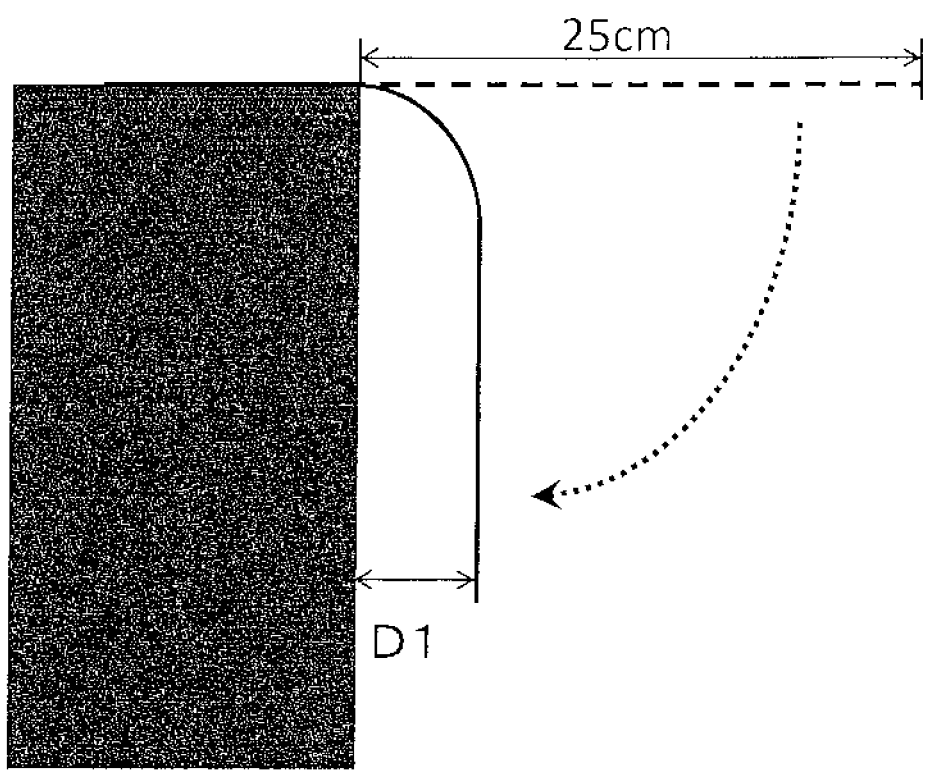
FIG. 16 is a schematic view showing how to measure drape level.

(3) Measurement of Drape Level
Reinforcing fiber bundle cut into 30 cm and extended straight is placed on a flat stand as preventing it from curving or twisting. In causing curve or twist, it is preferable that it is removed by heating below 100° C. or pressurizing below 0.1 MPa. As shown in FIG. 16, the partially separated fiber bundle cut into 30 cm length is fixed to an end of a rectangular solid stand so that 25 cm of the partially separated fiber bundle projects from the end of the stand at 23±5° C. Namely, a part of 5 cm from a tip of the partially separated fiber bundle is placed on the end of the stand. Then 5 minutes later, drape level D1 is determined by measuring the shortest distance between a side face of the stand and a tip of the partially separated fiber bundle which is not fixed to the stand. Then, the partially separated fiber bundle that has been subjected to the measurement is immersed in water at 25° C. for 5 minutes and been taken out to be drained. Next, drape level D2 is determined by the same method as drape level D1, except that the partially separated fiber bundle has been immersed after being absolutely dried at 80° C. for 24 hours at a vacuum condition. The measurement results of five samples n=5 are averaged.

(4) Measurement of Hardness

The hardness of partially separated fiber bundle is measured with a HANDLE-O-Meter ("CAN-1MCB" made by DAIEI KAGAKU SEIKI MFG. Co., Ltd.) according to JIS L-1096E (HANDLE-O-Meter method). The test piece for measuring a hardness has length of 10 cm while the partially separated fiber bundle is opened to adjust the width to 1 mm with respect to filament number 1,700 to 550. The slit width is set to 20 mm. The hardness is determined as a resisting force [g] of a test piece of partially separated fiber bundle placed on a test stand having the slit groove into which the test piece is pressed up to a predetermined depth (8 mm). The measurement results of 3 times are averaged.

(5) Measurement of Width Change Rate of Resin-Containing Reinforcing Fiber Bundle The resin-containing reinforcing fiber bundle widened to 85 mm from 30 mm of width before separating fibers for preparing a partially separated fiber bundle is cut into 230 mm of length of which position of 30 mm from an end thereof is clipped to measure each width of 5 points within 100 mm from the other end. The results of measurement are averaged to calculate W1 before the immersing. Then, it is immersed in water at 25° C. for 5 minutes and is taken out to be drained for 1 minute by hanging it in a condition that the clipped side is up. The results of measurement of each width of 5 points within 100 mm from the other end are averaged to calculate W2 before the immersing. Through the above-described processes, the width change rate of resin-containing carbon fiber bundle is calculated by the following formula:

Width change rate=W2/W1.

(6) Measurement of Width Change Rate of Chopped Fiber Bundle

The results of microscopic observation of each width of 5 points in chopped fiber bundle made by cutting partially separated fiber bundle are averaged to calculate W3 before the immersing. Then, it is immersed in water at 25° C. for 5 minutes and is taken out to be drained for 1 minute by placing it on KIMWIPE as preventing the placement from shifting. The results of measurement of each width of 5 points are averaged to calculate W4 before the immersing. Through the above-described processes, the width change rate of chopped fiber bundle is calculated by the following formula:

Width change rate=W4/W3.

(7) Measurement of Fiber Number Per Unit Width

The fiber number per unit width of resin-containing reinforcing fiber bundle is calculated by dividing a measured width (W1) of fiber bundle by the total number of single yarns (50,000 in this example) contained in the reinforcing fiber bundle as a raw material.

(8) Wf (Weight Content of Carbon Fiber in Fiber Reinforced Resin Forming Material)

The mass of a sample of about 2 g cut out of fiber reinforced resin forming material is measured. The sample is heated in an electric furnace at 500° C. for 1 hour to burn out organic substance such as matrix resin. It is cooled down to room temperature for measuring the mass of residual carbon fiber. Weight content Wf [wt %] of carbon fiber is calculated by determining a mass ratio of the carbon fiber to the sample before burning out organic substance such as matrix resin.

(9) Evaluation of Mechanical Characteristics

The fiber reinforced resin forming material is formed to prepare a flat plate shaped product having size of 500×400 mm. The flat plate is cut at angle of 0° in the longitudinal direction and at angle of 90° in the direction orthogonal thereto to prepare each 16 pieces (total 32 pieces) of test piece having size of 100×25×2 mm to be subjected to measurement according to JIS K7074 (1988). Mechanical characteristics of bending strength, bending elastic modulus, CV (Coefficient of Variance) levels [%] of bending strength and bending elastic modulus are determined.

(10) Fluid Test (Stamping Molding)

Stacked two sheets of fiber reinforced resin forming material of 150 mm×150 mm×2 mm are preheated to 260° C. of base material center temperature (temperature between two sheets) to be pressurized for 30 seconds at 10 MPa with a pressing machine heated to 150° C. Area A2 [mm$^2$] after compression and Area A1 [mm$^2$] of base material before pressing are measured to calculate flow rate according to the formula of A2/A1×100[%].

Example 1

Fiber bundle [A-1] was wound off with a winder at constant speed of 10 m/min through a vibration widening roll vibrating along the axis direction at 10 Hz to be subjected to a widening process so that a widened fiber bundle having width of 50 mm was prepared through a width restriction roll of 50 mm width.

The obtained widened fiber bundle wound off at constant speed of 5 m/min was continuously immersed in sizing solution of sizing agent [S-1] diluted with pure water to coat the widened fiber bundle with the primary sizing agent. Then, the widened fiber bundle coated with the primary sizing agent was dried to remove moisture with a hot roller at 150° C. and a drying furnace (atmospheric condition) at 200° C. Adhesion amount of sizing agent or water-soluble polyamide of such obtained primary sizing agent-added widened fiber bundle was calculated as 1.5 wt % according to the above-described measurement method. The widened fiber bundle was immersed in the sizing solution while the tension applied to the fiber bundle was being adjusted in case the width of widened fiber bundle was shrunk by surface tension. Then, such an obtained primary sizing agent-added widened fiber bundle was continuously immersed in sizing solution of application resin [P-1] diluted with pure water to coat the sizing agent-added widened fiber bundle with the application resin. Then, the sizing agent-added widened fiber bundle coated with the secondary sizing agent (application resin [P-1]) was dried to remove moisture with a hot roller at 250° C. and a drying furnace (atmospheric condition) at 250° C., and was subjected to a heat treatment for 1.5 minutes. Adhesion amount of application resin of such obtained application resin-added widened fiber bundle (reinforcing fiber bundle impregnated with resin) was calculated as 0.1 wt % according to the above-described measurement method of adhesion amount of sizing agent or water-soluble polyamide. Such a calculated amount corresponds to a total adhesion amount that doesn't include the amount of sizing agent initially added to the sizing agent-added widened fiber bundle.

For the obtained application resin-added widened fiber bundle, a fiber separation means was provided with fiber separation plates made of iron, having a shape of projection of 0.2 mm thickness, 3 mm width and 20 mm height, equally-spaced by 1 mm interval in parallel with the width direction of reinforcing fiber bundle. The fiber separation means was intermittently stabbed in and taken off the widened fiber bundle to prepare a partially separated fiber bundle.

The fiber separation means was stabbed to the widened fiber bundle running at constant speed of 10 m/min for 3 seconds to generate a separated fiber section and taken off for 0.2 seconds and then stabbed thereto again and again.

The obtained partially separated fiber bundle includes separated fiber sections and unseparated fiber sections, the separated fiber section having a fiber bundle separated into 50 parts in the width direction, the unseparated fiber section being formed at an end of at least one separated fiber section. When the partially separated fiber bundle of 1,500 mm was prepared without any yarn breakage, the twist of fiber present inside fiber bundle moved in the running direction while the fiber separation means was stabbed in and taken off. Although the fiber separation was performed by a stable width, a little wrapping was caused. Accordingly, the process passability was evaluated as "Acceptable." Table 1 shows results of width change rate W2/W1 of the application resin-added widened fiber bundle as well as drape test and hardness measurement of the partially separated fiber bundle.

As a result, a partially separated fiber bundle having 1,000 fibers/mm of fiber number per unit width and drape level D1 of 130 mm was obtained.

Then, the partially separated fiber bundle was continuously inserted into a rotary cutter to chop the fiber bundle into fiber length of 25 mm at cutting angle 20° so that a discontinuous fiber nonwoven fabric with isotropic fiber orientation was obtained by uniformly dispersing the fiber bundle. The obtained discontinuous fiber nonwoven fabric had 0.25 kg/m² of basis weight. Table 1 shows result of calculation based on the measurement of width change rate of the chopped fiber bundle.

Next, five layers of discontinuous fiber nonwoven fabric laminate was further laminated with nylon resin melt blow nonwoven fabric ("CM1001" made by Toray Industries, Inc.) so that the weight ratio of carbon fiber [A-1] to matrix resin [M-1] was 45/55 in the laminate. Then, a whole laminate sandwiched by stainless steel plates was preheated at 240° C. for 90 seconds and was hot-pressed with pressure of 2.0 MPa at 240° C. for 180 seconds. Then, it was cooled down to 50° C. under pressure so that a fiber reinforced resin forming material having thickness of 2 mm was produced. The application amount of resin was adjusted at a stage of preparing resin sheet so that the fiber reinforced resin forming material had 46 wt % of weight content of reinforcing fiber. Mechanical characteristics and fluidity test of the fiber reinforced resin forming material were evaluated. Table 1 shows the results. The result of bending strength 390 MPa, CV level of bending strength 8.5%, bending elastic modulus 24.1 GPa, CV level of bending elastic modulus 8.6% and flow rate 249% was estimated as "Good," according to the estimation standard where "Good" means a level of practically acceptable while "NG" means a level of practically unacceptable.

Example 2

A partially separated fiber bundle was produced and evaluated in the same manner as Example 1, except that adhesion amount of application resin [P-1] was 0.5 wt %. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,111 fibers/mm of fiber number per unit width and drape level D1 of 153 mm was obtained. The result of bending strength 431 MPa, CV level of bending strength 7.6%, bending elastic modulus 24.2 GPa, CV level of bending elastic modulus 7.6% and flow rate 241% was estimated as "Good," according to the estimation standard where "Good" means a level of practically acceptable while "NG" means a level of practically unacceptable.

Example 3

The result was evaluated in the same manner as Example 1, except that adhesion amount of application resin [P-1] was 1 wt %. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,020 fibers/mm of fiber number per unit width and drape level D1 of 171 mm was obtained. The result of bending strength 407 MPa, CV level of bending strength 7.7%, bending elastic modulus 24.3 GPa, CV level of bending elastic modulus 6.7% and flow rate 243% was estimated as "Good," according to the estimation standard where "Good" means a level of practically acceptable while "NG" means a level of practically unacceptable.

Example 4

The result was evaluated in the same manner as Example 1, except that adhesion amount of application resin [P-1] was 2 wt %. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,087 fibers/mm of fiber number per unit width and drape level D1 of 210 mm was obtained. The result of bending strength 417 MPa, CV level of bending strength 7.7%, bending elastic modulus 25.4 GPa, CV level of bending elastic modulus 7.2% and flow rate 260% was estimated as "Good," according to the estimation standard where "Good" means a level of practically acceptable while "NG" means a level of practically unacceptable.

Example 5

The result was evaluated in the same manner as Example 1, except that adhesion amount of application resin [P-1]

was 3 wt %. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,111 fibers/mm of fiber number per unit width and drape level D1 of 215 mm was obtained. The result of bending strength 396 MPa, CV level of bending strength 7.8%, bending elastic modulus 24.7 GPa, CV level of bending elastic modulus 7% and flow rate 255% was estimated as "Good," according to the estimation standard where "Good" means a level of practically acceptable while "NG" means a level of practically unacceptable.

Example 6

The result was evaluated in the same manner as Example 1, except that adhesion amount of application resin [P-1] was 5 wt %. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,020 fibers/mm of fiber number per unit width and drape level D1 of 235 mm was obtained. The result of bending strength 390 MPa, CV level of bending strength 8%, bending elastic modulus 24.3 GPa, CV level of bending elastic modulus 7.5% and flow rate 240% was estimated as "Good," according to the estimation standard where "Good" means a level of practically acceptable while "NG" means a level of practically unacceptable.

Comparative Example 1

The result was evaluated in the same manner as Example 1, except that adhesion amount of application resin [P-1] was 7 wt %. When the partially separated fiber bundle of 1,500 mm was prepared, the fiber bundle was rather hard and the fiber separation was not performed by a stable width. Accordingly, the process passability was evaluated as "NG." Since the partially separated fiber bundle was not stably produced while chopped fiber bundles were not prepared, the result was estimated as "NG," according to the estimation standard where "Good" means a level of practically acceptable while "NG" means a level of practically unacceptable.

Comparative Example 2

Fiber bundle [A-1] was wound off with a winder at constant speed of 10 m/min through a vibration widening roll vibrating along the axis direction at 10 Hz to be subjected to a widening process so that a widened fiber bundle having width of 50 mm was prepared through a width restriction roll of 50 mm width.

The obtained widened fiber bundle was continuously immersed in sizing solution of sizing agent [S-1] diluted with pure water to coat the widened fiber bundle with the primary sizing agent. Then, the widened fiber bundle coated with the primary sizing agent was dried to remove moisture with a hot roller at 150° C. and a drying furnace (atmospheric condition) at 200° C. Adhesion amount of sizing agent or water-soluble polyamide of such obtained primary sizing agent-added widened fiber bundle was calculated as 1.5 wt % according to the above-described measurement method. The widened fiber bundle was immersed in the sizing solution while the tension applied to the fiber bundle was being adjusted in case the width of widened fiber bundle was shrunk by surface tension.

For the obtained primary sizing agent-added widened fiber bundle, a fiber separation means was provided with fiber separation plates made of iron, having a shape of projection of 0.2 mm thickness, 3 mm width and 20 mm height, equally-spaced by 1 mm interval in parallel with the width direction of reinforcing fiber bundle. The fiber separation means was intermittently stabbed in and taken off the widened fiber bundle to prepare a partially separated fiber bundle.

The fiber separation means was stabbed to the widened fiber bundle running at constant speed of 10 m/min for 3 seconds to generate a separated fiber section and taken off for 0.2 seconds, and then was stabbed thereto again and again.

The obtained partially separated fiber bundle includes separated fiber sections and accumulated interlaced sections, the separated fiber section having a fiber bundle separated into 50 parts in the width direction, the accumulated interlaced section being formed at an end of at least one separated fiber section. When the partially separated fiber bundle of 1,500 mm was prepared, single yarn fluffs wrapped rollers or the like and the fiber separation was not performed by a stable width. Accordingly, the process passability was evaluated as "NG" or "Acceptable."

Mechanical characteristics and fluidity test were evaluated in the same manner as Example 1, except that the secondary sizing agent application process was not performed. As a result, a partially separated fiber bundle having 1,000 fibers/mm of fiber number per unit width and drape level D1 of 39 mm to obtain the result of bending strength 367 MPa, CV level of bending strength 15%, bending elastic modulus 23.3 GPa, CV level of bending elastic modulus 16.1% and flow rate 230%. Since the variances of strength and elastic modulus were greater than those of Examples 1 to 6, the result was estimated as "NG," according to the estimation standard where "Good" means a level of practically acceptable while "NG" means a level of practically unacceptable.

Comparative Example 3

Fiber bundle [A-1] was wound off with a winder at constant speed of 10 m/min through a vibration widening roll vibrating along the axis direction at 10 Hz to be subjected to a widening process so that a widened fiber bundle having width of 30 mm was prepared through a width restriction roll of 30 mm width.

The result was evaluated in the same manner as Example 4, except that the widened width was 30 mm. When the partially separated fiber bundle of 1,500 mm was prepared, the fiber bundle was rather hard and the fiber separation was not performed by a stable width. Accordingly, the process passability was evaluated as "Acceptable." The partially separated fiber bundle having 1,667 fibers/mm of fiber number per unit width and drape level D1 of 242 mm was obtained. The result of bending strength 378 MPa, CV level of bending strength 11%, bending elastic modulus 23.8 GPa, CV level of bending elastic modulus 10.2% and flow rate 263% was obtained. Since the variances of strength and elastic modulus were greater than those of Examples 1 to 6, the result was estimated as "NG," according to the estimation standard where "Good" means a level of practically acceptable while "NG" means a level of practically unacceptable.

Example 7

Fiber bundle [A-1] was wound off with a winder at constant speed of 10 m/min through a vibration widening roll vibrating along the axis direction at 10 Hz to be subjected to a widening process so that a widened fiber bundle having width of 36 mm was prepared through a width restriction roll of 35 mm width.

The result was evaluated in the same manner as Example 4, except that the widened width was 36 mm. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,389 fibers/mm of fiber number per unit width and drape level D1 of 225 mm was obtained. The result of bending strength 405 MPa, CV level of bending strength 7.8%, bending elastic modulus 24.7 GPa, CV level of bending elastic modulus 7.2% and flow rate 260% was estimated as "Good," according to the estimation standard where "Good" means a level of practically acceptable while "NG" means a level of practically unacceptable.

Example 8

Fiber bundle [A-1] was wound off with a winder at constant speed of 10 m/min through a vibration widening roll vibrating along the axis direction at 10 Hz to be subjected to a widening process so that a widened fiber bundle having width of 69 mm was prepared through a width restriction roll of 70 mm width.

The result was evaluated in the same manner as Example 4, except that the widened width was 69 mm. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 725 fibers/mm of fiber number per unit width and drape level D1 of 164 mm was obtained. The result of bending strength 420 MPa, CV level of bending strength 7.6%, bending elastic modulus 25.3 GPa, CV level of bending elastic modulus 7.1% and flow rate 254% was estimated as "Good," according to the estimation standard where "Good" means a level of practically acceptable while "NG" means a level of practically unacceptable.

Comparative Example 4

Fiber bundle [A-1] was wound off with a winder at constant speed of 10 m/min through a vibration widening roll vibrating along the axis direction at 10 Hz to be subjected to a widening process so that a widened fiber bundle having width of 85 mm was prepared through a width restriction roll of 90 mm width. The result was evaluated in the same manner as Example 4, except that the widened width was 85 mm. When the partially separated fiber bundle of 1,500 mm was prepared, the thin fiber bundle was cracked and the fiber separation was not performed by a stable width. Accordingly, the process passability was evaluated as "NG." Since desirable partially separated fiber bundle was not produced while chopped fiber bundles were not prepared, the result was estimated as "NG," according to the estimation standard where "Good" means a level of practically acceptable while "NG" means a level of practically unacceptable.

Example 9

Fiber bundle [A-1] was wound off with a winder at constant speed of 10 m/min through a vibration widening roll vibrating along the axis direction at 10 Hz to be subjected to a widening process so that a widened fiber bundle having width of 35 mm was prepared through a width restriction roll of 35 mm width.

The result was evaluated in the same manner as Example 5, except that the widened width was 35 mm. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,429 fibers/mm of fiber number per unit width and drape level D1 of 229 mm was obtained. The result of bending strength 392 MPa, CV level of bending strength 7.5%, bending elastic modulus 24.1 GPa, CV level of bending elastic modulus 6.8% and flow rate 265% was estimated as "Good," according to the estimation standard where "Good" means a level of practically acceptable while "NG" means a level of practically unacceptable.

Comparative Example 5

Fiber bundle [A-1] was wound off with a winder at constant speed of 10 m/min through a vibration widening roll vibrating along the axis direction at 10 Hz to be subjected to a widening process so that a widened fiber bundle having width of 50 mm was prepared through a width restriction roll of 50 mm width.

The obtained widened fiber bundle wound off at constant speed of 5 m/min was continuously immersed in sizing solution of sizing agent [S-1] diluted with pure water to coat the widened fiber bundle with the primary sizing agent. Then, the widened fiber bundle coated with the primary sizing agent was dried to remove moisture with a hot roller at 150° C. and a drying furnace (atmospheric condition) at 200° C. Adhesion amount of sizing agent or water-soluble polyamide of such obtained primary sizing agent-added widened fiber bundle was calculated as 1.5 wt % according to the above-described measurement method. The widened fiber bundle was immersed in the sizing solution while the tension applied to the fiber bundle was being adjusted in case the width of widened fiber bundle was shrunk by surface tension. Then, such an obtained primary sizing agent-added widened fiber bundle was continuously immersed in sizing solution of application resin [P-1] diluted with pure water to coat the sizing agent-added widened fiber bundle with the application resin. Then, the sizing agent-added widened fiber bundle coated with the secondary sizing agent (application resin [P-1]) was dried to remove moisture with a hot roller at 130° C. and a drying furnace (atmospheric condition) at 130° C., and was subjected to a heat treatment for 0.3 minutes. Adhesion amount of application resin of such obtained application resin-added widened fiber bundle (reinforcing fiber bundle impregnated with resin) was calculated as 2 wt % according to the above-described measurement method of adhesion amount of sizing agent or water-soluble polyamide. Such a calculated amount corresponds to a total adhesion amount that doesn't include the amount of sizing agent initially added to the sizing agent-added widened fiber bundle.

The result was evaluated in the same manner as Example 4, except that the temperature and time of heat treatment were 130° C. and 0.3 minutes. When the partially separated fiber bundle of 1,500 mm was prepared, wrapping was caused while the fiber separation was not performed by a stable width. Accordingly, the process passability was evaluated as "NG." Since desirable partially separated fiber bundle was not produced while chopped fiber bundles were not prepared, the result was estimated as "NG," according to the estimation standard where "Good" means a level of practically acceptable while "NG" means a level of practically unacceptable.

Example 10

The result was evaluated in the same manner as Example 4, except that the secondary sizing agent was subjected to a heat treatment at 130° C. for 15 minutes. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,042 fibers/mm of fiber number per unit width and drape level D1 of 214 mm was obtained. The result of bending strength 420 MPa, CV level of bending strength 7.7%, bending elastic modulus 25.6 GPa, CV level of bending elastic modulus 7.3% and flow rate 251% was estimated as "Good," according to the estimation standard where "Good" means a level of practically acceptable while "NG" means a level of practically unacceptable.

Example 11

The result was evaluated in the same manner as Example 4, except that the secondary sizing agent was subjected to a heat treatment at 350° C. for 0.4 minutes. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,064 fibers/mm of fiber number per unit width and drape level D1 of 200 mm was obtained. The result of bending strength 410 MPa, CV level of bending strength 7.9%, bending elastic modulus 25.3 GPa, CV level of bending elastic modulus 7.5% and flow rate 260% was estimated as "Good," according to the estimation standard where "Good" means a level of practically acceptable while "NG" means a level of practically unacceptable.

Comparative Example 6

The result was evaluated in the same manner as Example 4, except that the secondary sizing agent was subjected to a heat treatment at 350° C. for 16 minutes. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width although fibers were partially cracked, the process passability was evaluated as "Acceptable." The partially separated fiber bundle having 1,111 fibers/mm of fiber number per unit width and drape level D1 of 96 mm was obtained. The result of bending strength 354 MPa, CV level of bending strength 11%, bending elastic modulus 22.9 GPa, CV level of bending elastic modulus 12.3% and flow rate 233% was obtained. Since the variances of strength and elastic modulus were greater than those of Examples 1 to 6, the result was estimated as "NG," according to the estimation standard where "Good" means a level of practically acceptable while "NG" means a level of practically unacceptable.

Example 12

Fiber bundle [A-1] was wound off with a winder at constant speed of 10 m/min through a vibration widening roll vibrating along the axis direction at 10 Hz to be subjected to a widening process so that a widened fiber bundle having width of 50 mm was prepared through a width restriction roll of 50 mm width. The obtained widened fiber bundle was immersed in the same manner as Example 2, except that application resin [P-1] was used instead of sizing agent [S-1]. Adhesion amount of the primary sizing agent (application resin [P-1]) was 0.5 wt % while adhesion amount of the secondary sizing agent (application resin [P-1]) was 1.5 wt %. The adhesion amount of the secondary sizing agent (application resin [P-1]) doesn't include the amount of the primary sizing agent initially added to the primary sizing agent-added widened fiber bundle. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,000 fibers/mm of fiber number per unit width and drape level D1 of 198 mm was obtained. The result of bending strength 402 MPa, CV level of bending strength 7.6%, bending elastic modulus 24.5 GPa, CV level of bending elastic modulus 6.3% and flow rate 260% was estimated as "Good," according to the estimation standard where "Good" means a level of practically acceptable while "NG" means a level of practically unacceptable.

Example 13

The result was evaluated in the same manner as Example 4, except that application resin [P-2] was used instead of application resin [P-1]. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,042 fibers/mm of fiber number per unit width and drape level D1 of 224 mm was obtained. The result of bending strength 420 MPa, CV level of bending strength 8%, bending elastic modulus 25 GPa, CV level of bending elastic modulus 7.5% and flow rate 265% was estimated as "Good," according to the estimation standard where "Good" means a level of practically acceptable while "NG" means a level of practically unacceptable.

Example 14

The result was evaluated in the same manner as Example 4, except that application resin [P-3] was used instead of application resin [P-1]. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,111 fibers/mm of fiber number per unit width and drape level D1 of 211 mm was obtained. The result of bending strength 410 MPa, CV level of bending strength 7.8%, bending elastic modulus 24.5 GPa, CV level of bending elastic modulus 7.5% and flow rate 258% was estimated as "Good," according to the estimation standard where "Good" means a level of practically acceptable while "NG" means a level of practically unacceptable.

Example 15

The result was evaluated in the same manner as Example 4, except that application resin [P-3] was used instead of application resin [P-1]. When the partially separated fiber bundle of 1,500 mm was prepared without any yarn breakage and wrapping, the twist of fiber present inside fiber bundle moved in the running direction while the fiber separation means was stabbed in and taken off. Because the fiber separation was performed by a stable width, the process passability was evaluated as "Good." The partially separated fiber bundle having 1,000 fibers/mm of fiber number per unit width and drape level D1 of 214 mm was obtained. The result of bending strength 412 MPa, CV level of bending strength 8.1%, bending elastic modulus 25 GPa, CV level of bending elastic modulus 8% and flow rate 260% was estimated as "Good," according to the estimation standard where "Good" means a level of practically acceptable while "NG" means a level of practically unacceptable.

TABLE 1

| | Item | Unit | Example 1 | Example 2 | Example 3 | Example 4 | Example 5 |
|---|---|---|---|---|---|---|---|
| | Fiber | — | A-1 | A-1 | A-1 | A-1 | A-1 |
| | Matrix resin | — | M-1 | M-1 | M-1 | M-1 | M-1 |
| | Primary sizing agent | — | S-1 | S-1 | S-1 | S-1 | S-1 |
| | Adhesion amount of primary sizing agent | wt % | 1.5 | 1.5 | 1.5 | 1.5 | 1.5 |
| | Secondary sizing agent | — | P-1 | P-1 | P-1 | P-1 | P-1 |
| | Adhesion amount of secondary sizing agent | wt % | 0.1 | 0.5 | 1.0 | 2.0 | 3.0 |
| | Heat-treatment temperature | °C. | 250.0 | 250.0 | 250.0 | 250.0 | 250.0 |
| | Heat-treatment time | min | 1.5 | 1.5 | 1.5 | 1.5 | 1.5 |
| | Fiber number per unit width | 1/mm | 1,000 | 1,111 | 1,020 | 1,087 | 1,111 |
| | Fiber bundle thickness | mm | 0.07 | 0.08 | 0.07 | 0.08 | 0.08 |
| Fiber bundle width | W1 before immersing | mm | 50 | 45 | 49 | 46 | 45 |
| | W2 after immersing | mm | 33 | 38 | 41 | 38 | 39 |
| | Change rate W2/W1 | — | 0.66 | 0.84 | 0.84 | 0.83 | 0.87 |
| Drape level | D1 before immersing | mm | 130 | 153 | 171 | 210 | 215 |
| | D2 after immersing | mm | 129 | 156 | 180 | 210.2 | 214 |
| | Hardness | g | 40 | 95.2 | 118.2 | 117.2 | 150.2 |
| | Process passability | — | Acceptable | Good | Good | Good | Good |
| Bundle distribution | Standard deviation σ | — | 490 | 420 | 340 | 270 | 350 |
| Chopped fiber bundle width | W3 before immersing | mm | 0.95 | 0.96 | 0.98 | 1.11 | 1.12 |
| | W4 after immersing | mm | 0.61 | 0.81 | 0.94 | 0.97 | 1.13 |
| | Change rate W4/W3 | — | 0.64 | 0.84 | 0.96 | 0.88 | 1.00 |
| Mechanical characteristics | Bending strength | MPa | 390 | 431 | 407 | 417 | 396 |
| | Strength CV level | % | 8.5 | 7.6 | 7.7 | 7.7 | 7.8 |
| | Bending elastic modulus | GPa | 24.1 | 24.2 | 24.3 | 25.4 | 24.7 |
| | Elastic modulus CV level | % | 8.6 | 7.6 | 6.7 | 7.2 | 7 |
| Fluidity | Flow rate | % | 249 | 241 | 243 | 260 | 255 |
| | Evaluation | — | Good | Good | Good | Good | Good |

| | Item | Example 6 | Comparative Example 1 | Comparative Example 2 | Comparative Example 3 |
|---|---|---|---|---|---|
| | Fiber | A-1 | A-1 | A-1 | A-1 |
| | Matrix resin | M-1 | M-1 | M-1 | M-1 |
| | Primary sizing agent | S-1 | S-1 | S-1 | S-1 |
| | Adhesion amount of primary sizing agent | 1.5 | 1.5 | 1.5 | 1.5 |
| | Secondary sizing agent | P-1 | P-1 | P-1 | P-1 |
| | Adhesion amount of secondary sizing agent | 5.0 | 7.0 | 0.0 | 2.0 |
| | Heat-treatment temperature | 250.0 | 250.0 | 250.0 | 250.0 |
| | Heat-treatment time | 1.5 | 1.5 | 1.5 | 1.5 |
| | Fiber number per unit width | 1,020 | 1,000 | 1,000 | 1,667 |
| | Fiber bundle thickness | 0.07 | 0.07 | 0.07 | 0.12 |
| Fiber bundle width | W1 before immersing | 49 | 50 | 50 | 30 |
| | W2 after immersing | 44 | 47 | 5 | 28 |
| | Change rate W2/W1 | 0.90 | 0.94 | 0.10 | 0.93 |

TABLE 1-continued

| | | | | | |
|---|---|---|---|---|---|
| Drape level | D1 before immersing | 235 | 242 | 39 | 242 |
| | D2 after immersing | 234 | 241 | 38 | 241 |
| | Hardness | 168.0 | >200 | 11.2 | 179.7 |
| | Process passability | Good | NG | NG or Acceptable | Acceptable |
| Bundle distribution | Standard deviation σ | 340 | — | 600 | 300 |
| Chopped fiber bundle width | W3 before immersing | 1.11 | — | 1.06 | 1.12 |
| | W4 after immersing | 1.03 | — | 0.45 | 1.01 |
| | Change rate W4/W3 | 0.93 | — | 0.43 | 0.90 |
| Mechanical characteristics | Bending strength | 390 | — | 367 | 378 |
| | Strength CV level | 8 | — | 15 | 11 |
| | Bending elastic modulus | 24.3 | — | 23.3 | 23.8 |
| | Elastic modulus CV level | 7.5 | — | 16.1 | 10.2 |
| Fluidity | Flow rate | 240 | — | 230 | 263 |
| | Evaluation | Good | NG | NG | NG |

| Item | | Example 7 | Example 8 | Comparative Example 4 | Example 9 | Comparative Example 5 | Example 10 |
|---|---|---|---|---|---|---|---|
| | Fiber | A-1 | A-1 | A-1 | A-1 | A-1 | A-1 |
| | Matrix resin | M-1 | M-1 | M-1 | M-1 | M-1 | M-1 |
| | Primary sizing agent | S-1 | S-1 | S-1 | S-1 | S-1 | S-1 |
| | Adhesion amount of primary sizing agent | 1.5 | 1.5 | 1.5 | 1.5 | 1.5 | 1.5 |
| | Secondary sizing agent | P-1 | P-1 | P-1 | P-1 | P-1 | P-1 |
| | Adhesion amount of secondary sizing agent | 2.0 | 2.0 | 2.0 | 3.0 | 2.0 | 2.0 |
| | Heat-treatment temperature | 250.0 | 250.0 | 250.0 | 250.0 | 130.0 | 130.0 |
| | Heat-treatment time | 1.5 | 1.5 | 1.5 | 1.5 | 0.3 | 15.0 |
| | Fiber number per unit width | 1,389 | 725 | 588 | 1,429 | 1,000 | 1,042 |
| | Fiber bundle thickness | 0.10 | 0.05 | 0.04 | 0.10 | 0.07 | 0.07 |
| Fiber bundle width | W1 before immersing | 36 | 69 | 85 | 35 | 50 | 48 |
| | W2 after immersing | 32 | 60 | 72 | 31 | 21 | 44 |
| | Change rate W2/W1 | 0.89 | 0.87 | 0.85 | 0.89 | 0.42 | 0.92 |
| Drape level | D1 before immersing | 225 | 164 | 115 | 229 | 108 | 214 |
| | D2 after immersing | 223 | 196 | 117 | 227 | 50 | 211 |
| | Hardness | 149.7 | 78.1 | 63.4 | 196.6 | 96.8 | 127.0 |
| | Process passability | Good | Good | NG | Good | NG | Good |
| Bundle distribution | Standard deviation σ | 280 | 270 | — | 310 | — | 280 |
| Chopped fiber bundle width | W3 before immersing | 1.11 | 1.11 | 1.08 | 1.09 | — | 1.11 |
| | W4 after immersing | 0.99 | 0.98 | 0.95 | 1.00 | — | 0.99 |
| | Change rate W4/W3 | 0.89 | 0.88 | 0.88 | 0.92 | — | 0.89 |
| Mechanical characteristics | Bending strength | 405 | 420 | — | 392 | — | 420 |
| | Strength CV level | 7.8 | 7.6 | — | 7.5 | — | 7.7 |
| | Bending elastic modulus | 24.7 | 25.3 | — | 24.1 | — | 25.6 |
| | Elastic modulus CV level | 7.2 | 7.1 | — | 6.8 | — | 7.3 |
| Fluidity | Flow rate | 260 | 254 | — | 265 | — | 251 |
| | Evaluation | Good | Good | NG | Good | NG | Good |

| Item | | Example 11 | Comparative Example 6 | Example 12 | Example 13 | Example 14 | Example 15 |
|---|---|---|---|---|---|---|---|
| | Fiber | A-1 | A-1 | A-1 | A-1 | A-1 | A-1 |
| | Matrix resin | M-1 | M-1 | M-1 | M-1 | M-1 | M-1 |
| | Primary sizing agent | S-1 | S-1 | P-1 | S-1 | S-1 | S-1 |
| | Adhesion amount of primary sizing agent | 1.5 | 1.5 | 1.5 | 1.5 | 1.5 | 1.5 |
| | Secondary sizing agent | P-1 | P-1 | P-1 | P-2 | P-3 | P-4 |
| | Adhesion amount of secondary sizing agent | 2.0 | 2.0 | 0.5 | 2.0 | 2.0 | 2.0 |
| | Heat-treatment temperature | 350.0 | 350.0 | 250.0 | 250.0 | 250.0 | 250.0 |
| | Heat-treatment time | 0.4 | 16.0 | 1.5 | 1.5 | 1.5 | 1.5 |
| | Fiber number per unit width | 1,064 | 1,111 | 1,000 | 1,042 | 1,111 | 1,000 |
| | Fiber bundle thickness | 0.07 | 0.08 | 0.07 | 0.07 | 0.08 | 0.07 |
| Fiber bundle width | W1 before immersing | 47 | 45 | 50 | 48 | 45 | 50 |
| | W2 after immersing | 36 | 20 | 43 | 44 | 38 | 43 |
| | Change rate W2/W1 | 0.77 | 0.44 | 0.86 | 0.92 | 0.84 | 0.86 |
| Drape level | D1 before immersing | 200 | 96 | 198 | 224 | 211 | 214 |
| | D2 after immersing | 197 | 70 | 190 | 221 | 207 | 216 |
| | Hardness | 110.1 | 61.0 | 119.3 | 121.6 | 120.1 | 120.9 |
| | Process passability | Good | Acceptable | Good | Good | Good | Good |
| Bundle distribution | Standard deviation σ | 290 | 600 | 330 | 260 | 280 | 280 |
| Chopped fiber bundle width | W3 before immersing | 1.03 | 0.80 | 1.09 | 1.06 | 1.10 | 1.09 |
| | W4 after immersing | 0.89 | 0.58 | 0.96 | 0.98 | 1.00 | 0.96 |
| | Change rate W4/W3 | 0.86 | 0.73 | 0.88 | 0.92 | 0.91 | 0.88 |
| Mechanical characteristics | Bending strength | 410 | 354 | 402 | 420 | 410 | 412 |
| | Strength CV level | 7.9 | 11 | 7.6 | 8 | 7.8 | 8.1 |

TABLE 1-continued

|  |  |  |  |  |  |  |  |
|---|---|---|---|---|---|---|---|
|  | Bending elastic modulus | 25.3 | 22.9 | 24.5 | 25 | 24.5 | 25 |
|  | Elastic modulus CV level | 7.5 | 12.3 | 6.3 | 7.5 | 7.5 | 8 |
| Fluidity | Flow rate | 260 | 233 | 260 | 265 | 258 | 260 |
|  | Evaluation | Good | NG | Good | Good | Good | Good |

INDUSTRIAL APPLICATIONS

Our bundles, methods and materials are capable of adding application resin at an appropriate timing to maintain an appropriate form of partially separated fiber is applicable to any fiber bundles required to separate a fiber bundle into two or more of thin bundles. We specifically provide reinforcing fibers can be impregnated with matrix resin to prepare any fiber reinforced composite material.

The invention claimed is:

1. A partially separated fiber bundle having a surface of a reinforcing fiber coated with a primary sizing agent and a secondary sizing agent containing a water-soluble polyamide-based resin, in which a separated fiber section consisting of a plurality of separated fiber bundles and an unseparated fiber section are provided alternately along a longitudinal direction of the reinforcing fiber bundle consisting of a plurality of single yarns, wherein the reinforcing fiber bundle contains 600 fibers/mm or more and less than 1,600 fibers/mm of fibers per unit width while the reinforcing fiber bundle has a drape level of 120 mm or more and 240 mm or less.

2. The partially separated fiber bundle according to claim 1, wherein the primary sizing agent contains a compound having a functional group selected from the group consisting of epoxy group, urethane group, amino group or carboxyl group or contains a mixture thereof.

3. The partially separated fiber bundle according to claim 1, wherein the water-soluble polyamide-based resin is contained in an outermost surface layer of the reinforcing fiber bundle.

4. The partially separated fiber bundle according to claim 1, wherein the partially separated fiber bundle has a hardness of 39 g or more and 200 g or less.

5. The partially separated fiber bundle according to of claim 1, wherein the water-soluble polyamide-based resin is contained in the partially separated fiber bundle in an adhesion amount of 0.1 wt % or more and 5 wt % or less.

6. The partially separated fiber bundle according to claim 1, wherein a width change rate W2/W1 is 0.5 or more and 1.1 or less, where the W1 indicates a width of the reinforcing fiber before being immersed in water while the W2 indicates a width of the reinforcing fiber is immersed in water at 25° C. for 5 minutes and is taken out.

7. The partially separated fiber bundle according to claim 1, wherein a drape level D2 in air of the partially separated fiber bundle immersed in water at 25° C. for 5 minutes is 110 mm or more and 240 mm or less.

8. The partially separated fiber bundle according to claim 1, wherein the separated fiber sections adjacent to each other through one of the unseparated fiber sections have different lengths.

9. A chopped fiber bundle made by chopping the partially separated fiber bundle according to claim 1, wherein a width change rate W4/W3 is 0.6 or more and 1.1 or less, where the W3 indicates a width of the chopped fiber bundle before being immersed while the W4 indicates a width of the chopped fiber bundle immersed in water at 25° C. for 5 minutes and is taken out.

10. The chopped fiber bundle according to claim 9, wherein the partially separated fiber bundle was chopped at an angle θ with respect to a longitudinal direction, where the angle θ is more than 0° and less than 90°.

11. A fiber reinforced resin forming material comprising a matrix resin and the chopped fiber bundle according to claim 9.

12. The fiber reinforced resin forming material according to claim 11, wherein the matrix resin is a polyamide.

13. A method of manufacturing a partially separated fiber bundle, comprising:
fiber separation step [A] of generating fiber separation parts by stabbing a fiber separation means provided with a plurality of projections into a fiber bundle consisting of a plurality of single yarns and runs along a longitudinal direction;
interlacing step [B] of forming an interlaced section at which the single yarns interlace a contact part of the projection in at least one of the fiber separation parts;
partial fiber separation step [C] taking the fiber separation means off the fiber bundle and again stabbing the fiber separation means into the fiber bundle after passing through an accumulated interlaced section so that separated fiber sections and unseparated fiber sections are formed alternately; and
resin impregnation step [D] adding a water-soluble polyamide to the fiber bundle,
wherein the resin impregnation step [D] is performed after opening and widening the fiber bundle consisting of a plurality of single yarns.

14. A method of manufacturing a partially separated fiber bundle, comprising:
fiber separation step [A] of generating fiber separation parts by stabbing a fiber separation means provided with a plurality of projections into a fiber bundle consisting of a plurality of single yarns and runs along a longitudinal direction;
interlacing step [B] of forming an interlaced section at which the single yarns interlace a contact part of the projection in at least one of the fiber separation parts;
partial fiber separation step [C] taking the fiber separation means off the fiber bundle and again stabbing the fiber separation means into the fiber bundle after passing through an accumulated interlaced section so that separated fiber sections and unseparated fiber sections are formed alternately; and
resin impregnation step [D] adding a water-soluble polyamide to the fiber bundle,
wherein the fiber bundle is impregnated with the water-soluble polyamide of 0.1 to 20 wt % dissolved in a solvent to prepare a polymer solution in the resin impregnation step [D].

15. The method according to claim 13, wherein the fiber separation step [A] is performed after the fiber bundle impregnated with the water-soluble polyamide in the resin impregnation step [D] is subjected to a heat treatment.

16. The method according to claim 15, wherein the fiber bundle impregnated with the water-soluble polyamide in the resin impregnation step [D] is subjected to the heat treatment at 130° C. to 350° C.

17. The method according to claim 15, wherein the fiber bundle impregnated with the water-soluble polyamide in the resin impregnation step [D] is subjected to the heat treatment for 0.33 to 15 minutes.

18. The method according to claim 13, wherein the fiber bundle is impregnated with the water-soluble polyamide of 0.1 to 20 wt % dissolved in a solvent to prepare a polymer solution in the resin impregnation step [D].

* * * * *